US012613963B2

(12) United States Patent (10) Patent No.: US 12,613,963 B2
Kamo et al. (45) Date of Patent: Apr. 28, 2026

(54) STORAGE SYSTEM AND MALICIOUS PROGRAM DETECTION METHOD

(71) Applicant: Hitachi, Ltd., Tokyo (JP)

(72) Inventors: Yuto Kamo, Tokyo (JP); Mitsuo Hayasaka, Tokyo (JP)

(73) Assignee: Hitachi Vantara, LTD., Kanagawa-Ken (JP)

( * ) Notice: Subject to any disclaimer, the term of this patent is extended or adjusted under 35 U.S.C. 154(b) by 168 days.

(21) Appl. No.: 18/442,722

(22) Filed: Feb. 15, 2024

(65) Prior Publication Data

US 2025/0028830 A1 Jan. 23, 2025

(30) Foreign Application Priority Data

Jul. 18, 2023 (JP) ................................. 2023-116871

(51) Int. Cl.
 *G06F 21/56* (2013.01)
 *G06F 21/57* (2013.01)
(52) U.S. Cl.
 CPC .......... *G06F 21/566* (2013.01); *G06F 21/572* (2013.01); *G06F 2221/033* (2013.01)

(58) Field of Classification Search
 CPC ................. G06F 21/566; G06F 21/572; G06F 2221/033; G06F 16/1748; G06F 17/1752
 See application file for complete search history.

(56) References Cited

U.S. PATENT DOCUMENTS

| | | | |
|---|---|---|---|
| 2019/0108341 A1* | 4/2019 | Bedhapudi .......... | G06F 16/1734 |
| 2020/0099699 A1* | 3/2020 | Saad ................... | G06F 11/2076 |
| 2021/0216627 A1 | 7/2021 | Grunwald et al. | |

* cited by examiner

*Primary Examiner* — Paul E Callahan
(74) *Attorney, Agent, or Firm* — Volpe Koenig

(57) ABSTRACT

Provided is a storage system capable of detecting a malicious program without executing compression processing of data. A storage system includes a processor that processes data input to and output from a storage device. The processor operates thereon a duplication detection program which deduplicates duplicated data, stores the deduplicated data in the storage device, calculates a duplication rate being a ratio of duplicated data in a predetermined unit of storage, and detects a change between a duplication rate before an update of the data and a duplication rate after the update of the data in units of the predetermined unit of storage. Moreover, the processor operates thereon a ransomware detection program which detects that the data is updated by ransomware, when a decrease amount of the duplication rate exceeds a duplication rate threshold value relating to the change in duplication rate detected by the duplication detection program.

9 Claims, 16 Drawing Sheets

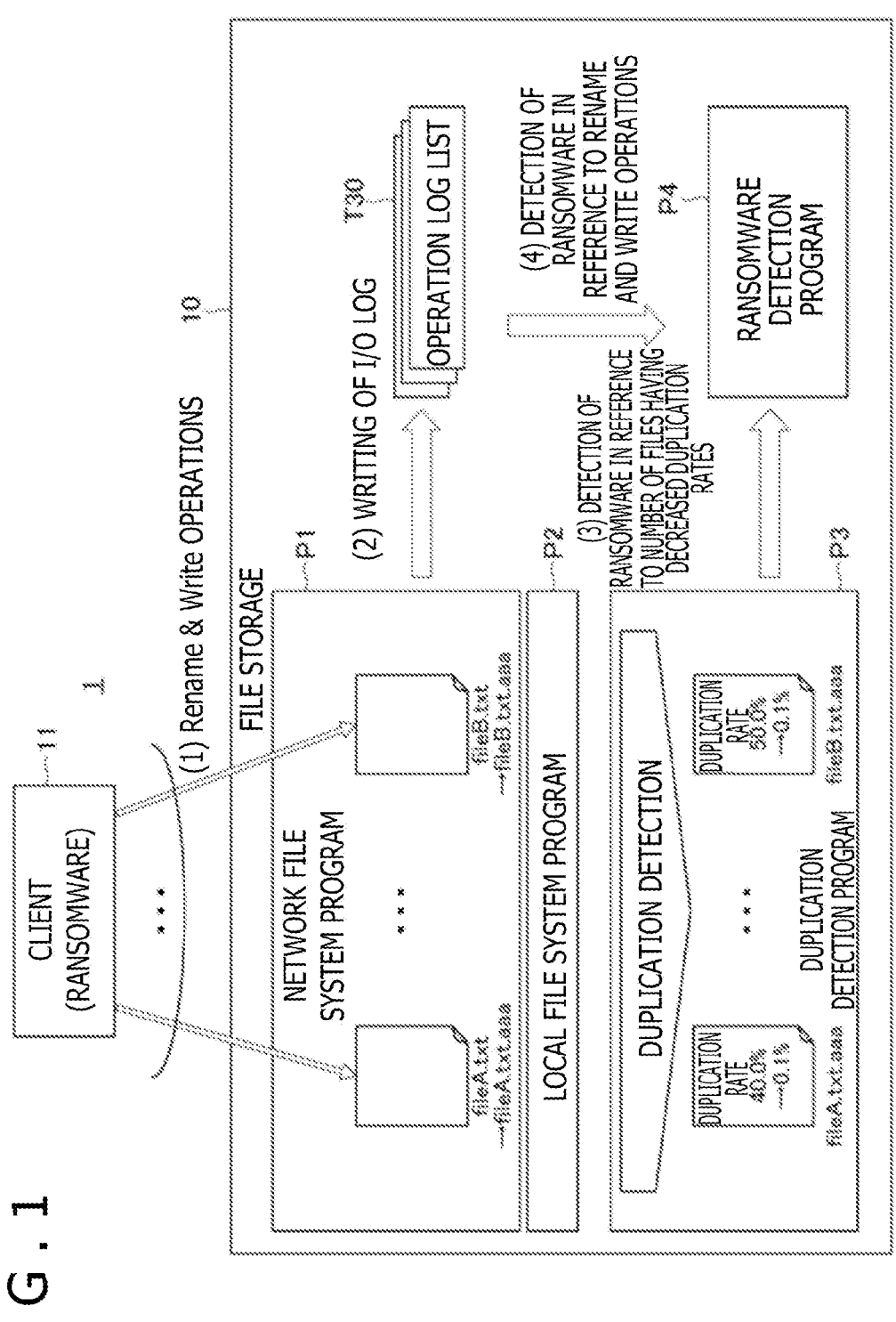
F I G . 1

F I G . 2
FILE BEFORE UPDATE
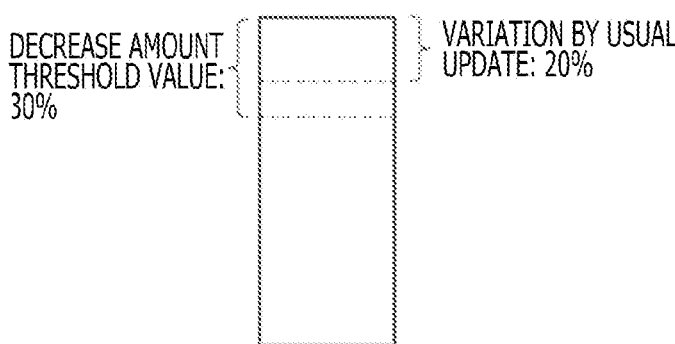
DECREASE AMOUNT
THRESHOLD VALUE:
30%
VARIATION BY USUAL
UPDATE: 20%
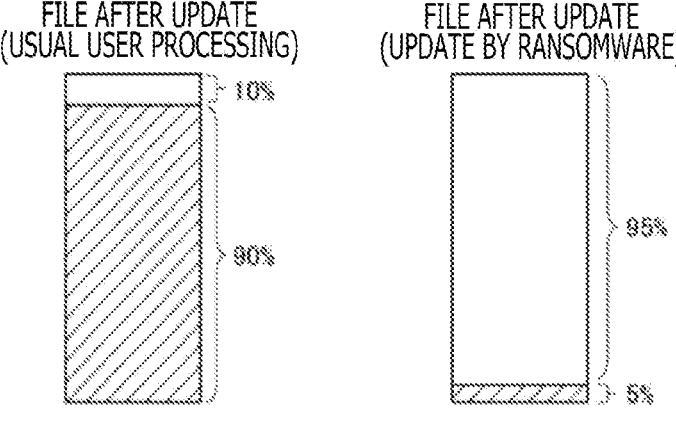
FILE AFTER UPDATE
(USUAL USER PROCESSING)
10%
90%
FILE AFTER UPDATE
(UPDATE BY RANSOMWARE)
95%
5%
DUPLICATION
RATE

FIG.4

T10 DUPLICATION STATE          FIELD GROUP FOR EACH CHUNK
MANAGEMENT TABLE

| FILE ID (C11) | DUPLICATION RATE (C12) | INTRA FILE OFFSET (C13) | POST-DUPLICATION DETERMINATION PROCESSING FLAG (C14) | DUPLICATION STATE (C15) | FINGERPRINT (C16) |
|---|---|---|---|---|---|
| XX | 50% | 0 | False | NOT DUPLICATED | AAAAAAAA |
|  |  | 4096 | True | DUPLICATED | XXXXXXXX |
|  |  | 8192 | False | DUPLICATED | YYYYYYYY |

FIG.5

T20 DUPLICATED CHUNK DETERMINATION TABLE

| FINGERPRINT (C21) | NUMBER OF CHUNKS (C22) |
|---|---|
| XXXXXXXX | 3 |
| AAAAAAAA | 1 |
| YYYYYYYY | 2 |

FIG.6

T30 OPERATION LOG LIST

| OPERATION TYPE | FILE HANDLER | TYPE | Offset | Length | Flag | Timestamp |
|---|---|---|---|---|---|---|
| | C31 | C32 | C33 | C34 | C35 | C36 | C37 |
| Rename | 0x100000 | FILE | – | – | – | T0 |
| Rename | 0x100011 | FILE | – | – | – | T1 |
| Write | 0x100000 | FILE | 256 | 512 | – | T2 |
| Write | 0x100000 | FILE | 8192 | 512 | – | T3 |
| Write | 0x100011 | FILE | 256 | 512 | – | T4 |
| Write | 0x100011 | FILE | 8192 | 512 | – | T5 |
| DUPLICATION DETERMINATION | 0x100000 | FILE | – | – | True | T6 |
| DUPLICATION DETERMINATION | 0x100011 | FILE | – | – | False | T7 |
| Create | 0x200000 | DIRECTORY | – | – | – | T9 |

F I G . 7

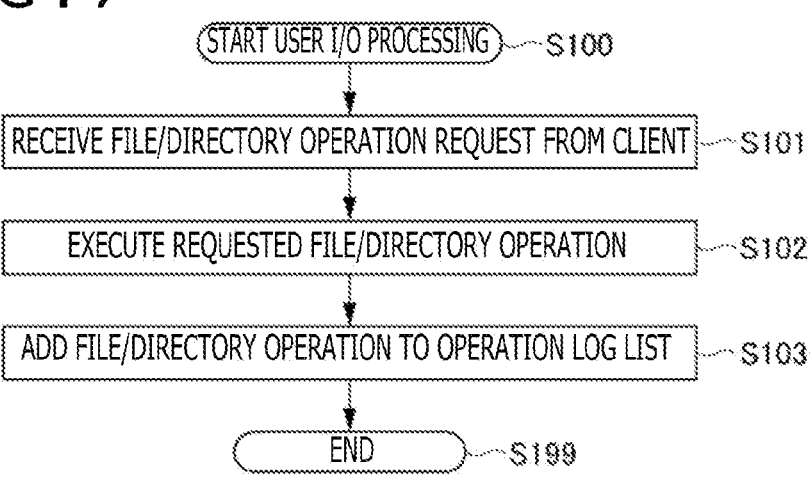

START USER I/O PROCESSING — S100

RECEIVE FILE/DIRECTORY OPERATION REQUEST FROM CLIENT — S101

EXECUTE REQUESTED FILE/DIRECTORY OPERATION — S102

ADD FILE/DIRECTORY OPERATION TO OPERATION LOG LIST — S103

END — S199

F I G . 8

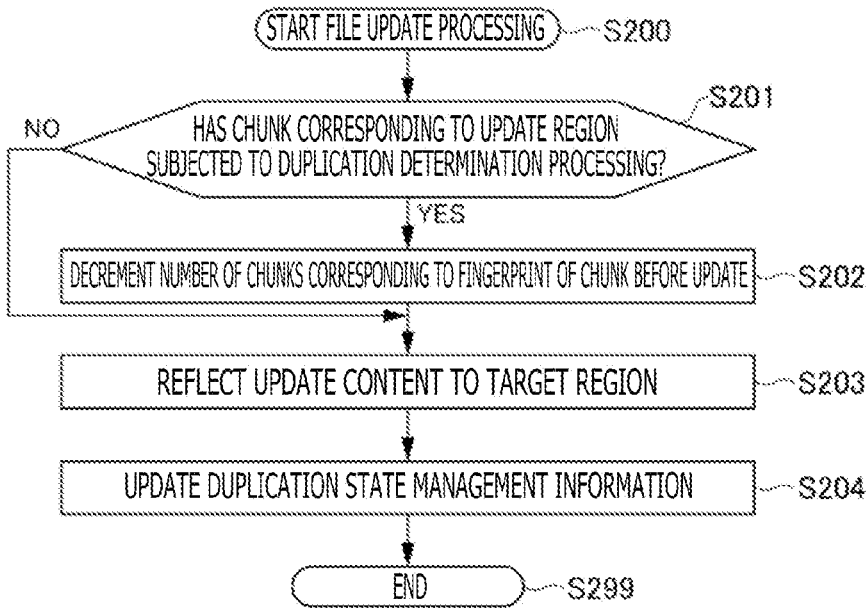

START FILE UPDATE PROCESSING — S200

HAS CHUNK CORRESPONDING TO UPDATE REGION SUBJECTED TO DUPLICATION DETERMINATION PROCESSING? — S201

NO

YES

DECREMENT NUMBER OF CHUNKS CORRESPONDING TO FINGERPRINT OF CHUNK BEFORE UPDATE — S202

REFLECT UPDATE CONTENT TO TARGET REGION — S203

UPDATE DUPLICATION STATE MANAGEMENT INFORMATION — S204

END — S299

F I G . 9
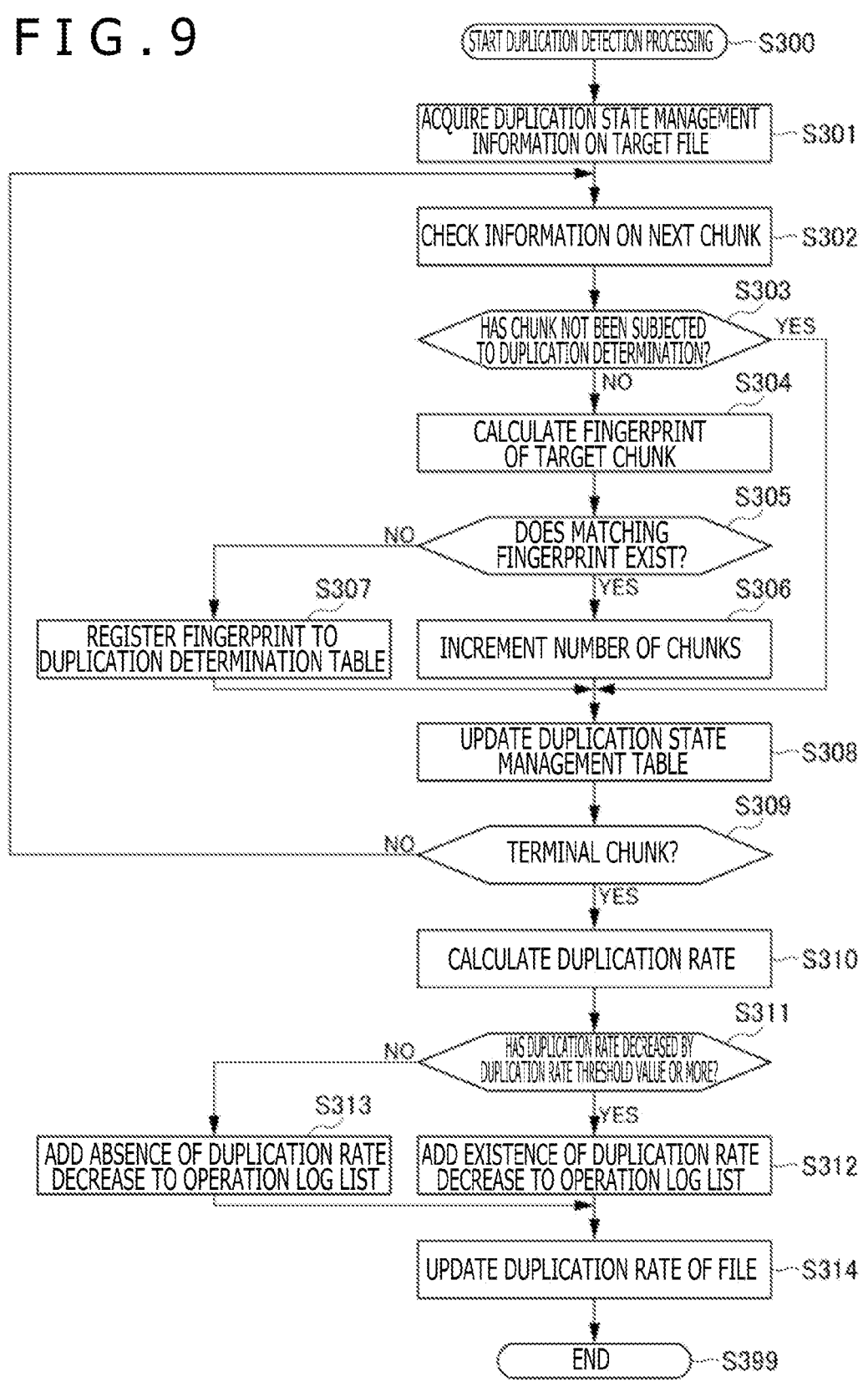

FIG.10

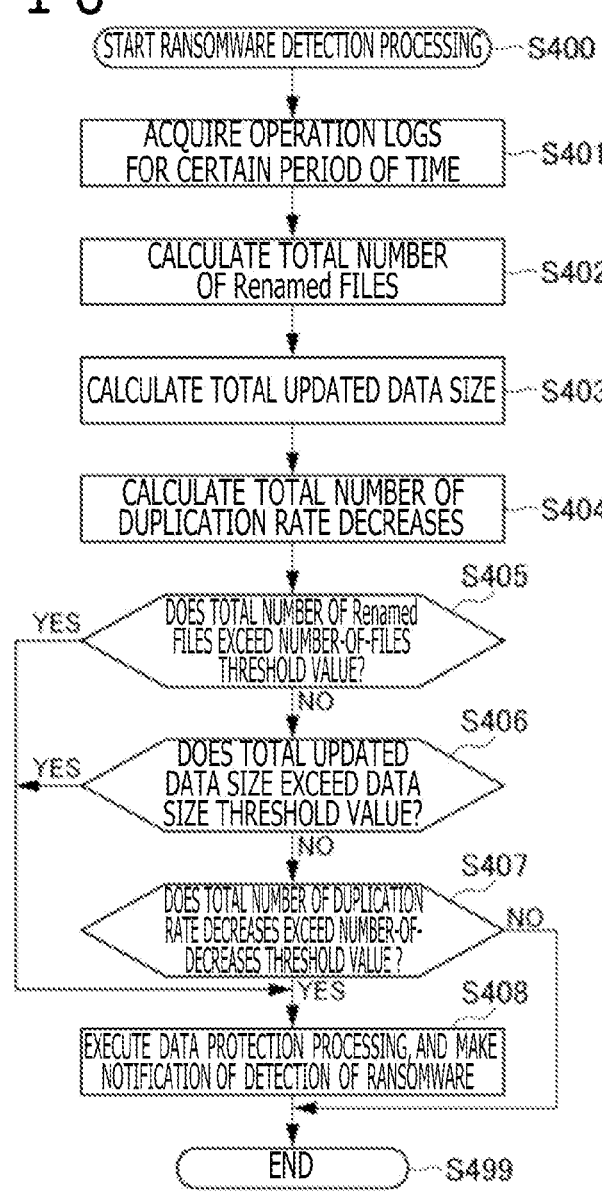

START RANSOMWARE DETECTION PROCESSING — S400

ACQUIRE OPERATION LOGS
FOR CERTAIN PERIOD OF TIME — S401

CALCULATE TOTAL NUMBER
OF Renamed FILES — S402

CALCULATE TOTAL UPDATED DATA SIZE — S403

CALCULATE TOTAL NUMBER OF
DUPLICATION RATE DECREASES — S404

S405
YES ← DOES TOTAL NUMBER OF Renamed
FILES EXCEED NUMBER-OF-FILES
THRESHOLD VALUE?
NO

S406
YES ← DOES TOTAL UPDATED
DATA SIZE EXCEED DATA
SIZE THRESHOLD VALUE?
NO

S407
DOES TOTAL NUMBER OF DUPLICATION
RATE DECREASES EXCEED NUMBER-OF-
DECREASES THRESHOLD VALUE ? → NO
YES        S408

EXECUTE DATA PROTECTION PROCESSING, AND MAKE
NOTIFICATION OF DETECTION OF RANSOMWARE

END — S499

T40 FILE TYPE DUPLICATION RATE MANAGEMENT TABLE

| FILE TYPE | DUPLICATION RATE |
|-----------|------------------|
| mp4 | 7% |
| txt | 72% |
| dat | 81% |

F I G . 1 4
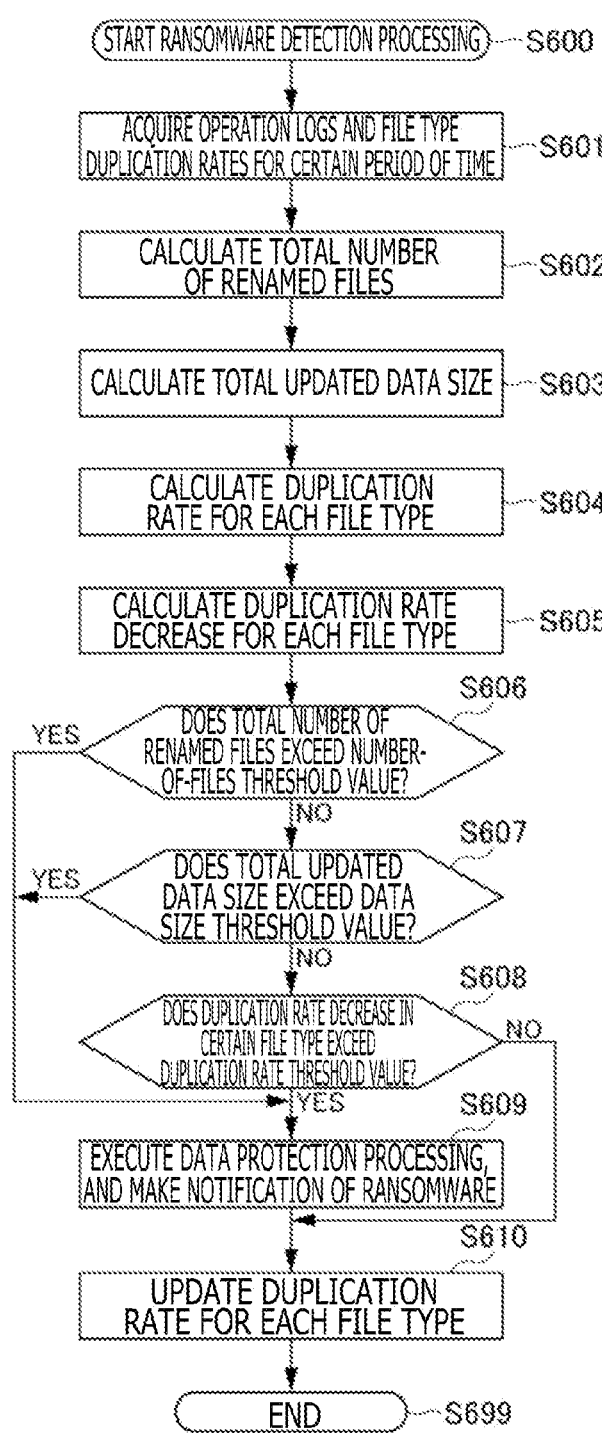

FIG.16

FIELD GROUP FOR EACH CHUNK

T50 DUPLICATION STATE MANAGEMENT TABLE

| C51 | C52 | C53 | C54 | C55 | C56 |
|-----|-----|-----|-----|-----|-----|
| Volume ID | DUPLICATION RATE | INTRA-VOLUME OFFSET | POST-DUPLICATION DETERMINATION PROCESSING FLAG | DUPLICATION STATE | FINGERPRINT |
| 0 | 50% | 0x0000 | False | NOT DUPLICATED | AAAAAAAA |
|   |     | 0x0002 | True | DUPLICATED | XXXXXXXX |
|   |     | 0x0004 | False | DUPLICATED | YYYYYYYY |
|   |     | ... | ... | ... | ... |
| 1 | 60% | 0x0000 | True | DUPLICATED | XXXXXXXX |
|   |     | ... | ... | ... | ... |

FIG.17

T60 OPERATION LOG LIST

| C61 | C62 | C63 | C64 | C65 |
|-----|-----|-----|-----|-----|
| OPERATION TYPE | LBA | Size | Flag | Timestamp |
| Write | 0x0000 | 1 | — | T0 |
| Write | 0x0100 | 32 | — | T1 |
| Write | 0x0200 | 32 | — | T2 |
| Write | 0x0600 | 32 | — | T3 |
| DUPLICATION RATE CALCULATION | — | — | True | T4 |
| DUPLICATION RATE CALCULATION | — | — | False | T5 |
| Read | 0x2000 | — | — | T6 |

F I G . 1 8

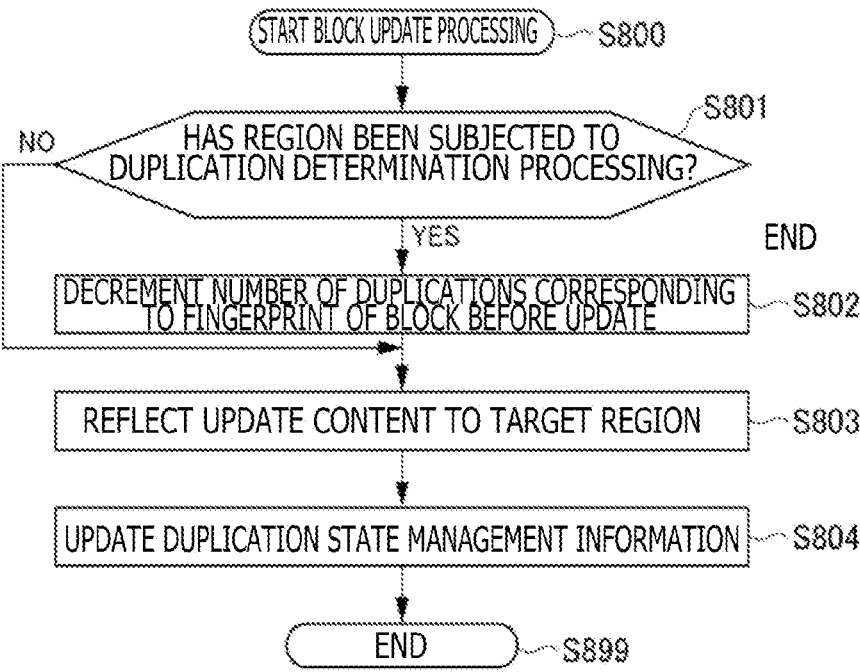

START BLOCK I/O PROCESSING — S700

RECEIVE BLOCK I/O REQUEST FROM CLIENT — S701

EXECUTE REQUESTED BLOCK I/O OPERATION — S702

ADD BLOCK I/O OPERATION TO OPERATION LOG LIST — S703

END — S799

F I G . 1 9

START BLOCK UPDATE PROCESSING — S800

HAS REGION BEEN SUBJECTED TO DUPLICATION DETERMINATION PROCESSING? — S801

NO                                        YES          END

DECREMENT NUMBER OF DUPLICATIONS CORRESPONDING TO FINGERPRINT OF BLOCK BEFORE UPDATE — S802

REFLECT UPDATE CONTENT TO TARGET REGION — S803

UPDATE DUPLICATION STATE MANAGEMENT INFORMATION — S804

END — S899

F I G . 2 0
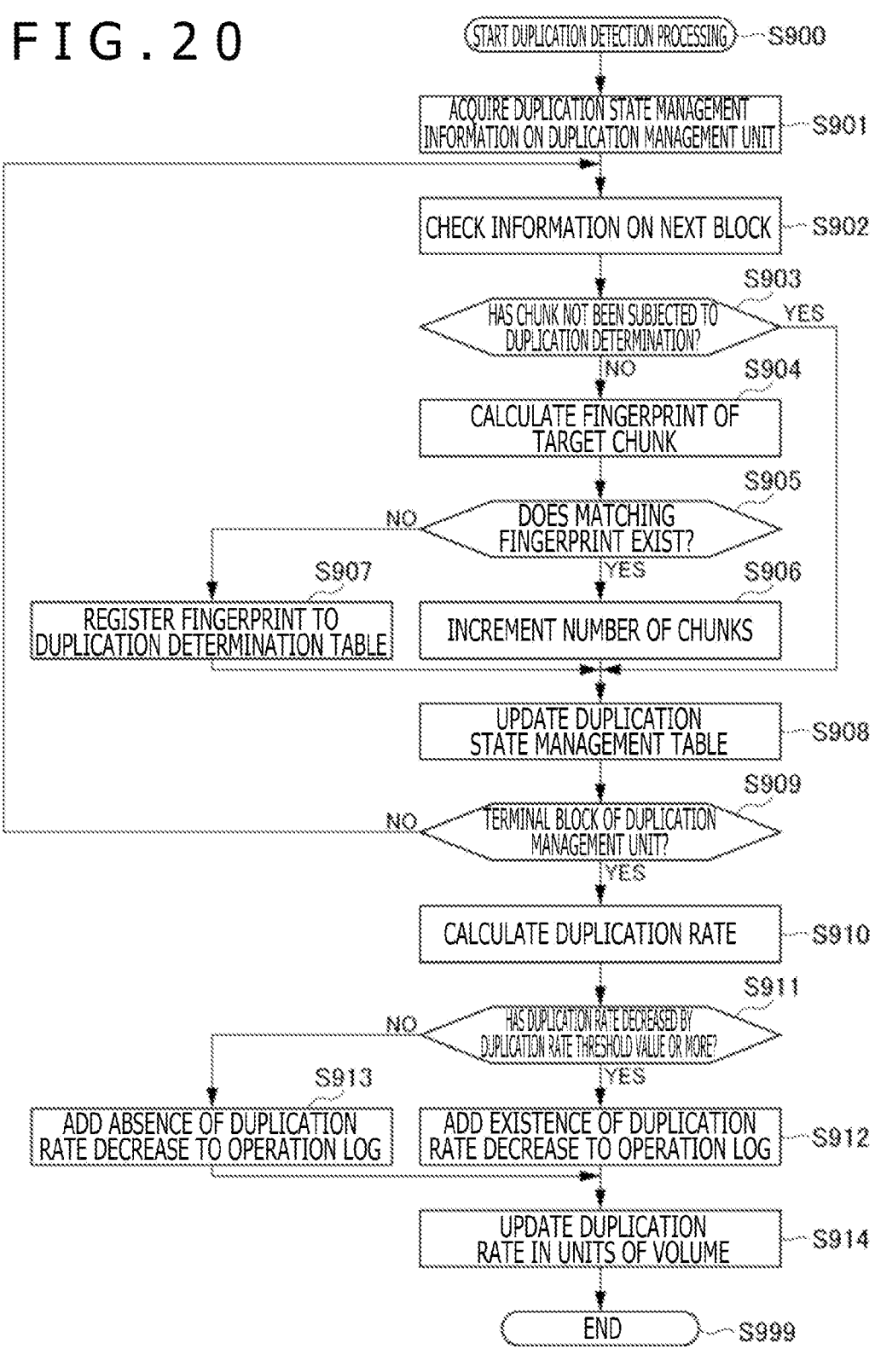

STORAGE SYSTEM AND MALICIOUS PROGRAM DETECTION METHOD

BACKGROUND OF THE INVENTION

1. Field of the Invention

The present invention relates to a storage system and a malicious program detection method.

2. Description of the Related Art

In recent years, there has been a sharp increase in cyber-attacks of the Destruction of Service type by a malicious program represented by ransomware. As the ransomware, there is known malware which encrypts files and asks for a ransom in exchange for decryption of the files. The malware is malicious software and a malicious code.

The ransomware not only drives an operating information technology (IT) system into a stop of services, but also destructs data in the IT system and a backup, thereby causing serious damage on not only the IT system but also business itself provided through the IT system. In order to protect data from such damage, there is desired a storage which detects the ransomware at an early stage and can restore the data to the pre-attack state.

In U.S. Patent Application Publication No. 2021/0216627, there is described "performing, in response to the determination that the request is indicative of a malicious action, a remedial action with respect to the requested operation."

In a storage system which uses U.S. Patent Application Publication No. 2021/0216627, when compressible data is overwritten with data difficult to compress or when the number of Write requests in a certain period of time is large, it is determined that ransomware possibly exists. However, it is always required to execute compression processing to detect ransomware, hence posing such a problem that a performance of the storage system significantly decreases.

SUMMARY OF THE INVENTION

The present invention has been made in view of this situation and has a purpose of detecting a malicious program without executing compression processing for data.

A storage system according to the present invention includes a processor that processes data input to and output from a storage device, the processor deduplicates duplicated data, stores the deduplicated data in the storage device, and calculates a duplication rate being a ratio of duplicated data in a predetermined unit of storage, and the storage system includes a duplication detection section that operates on the processor and detects a change between a duplication rate before an update of the data and a duplication rate after the update of the data in units of the predetermined unit of storage, and a malicious program detection section that operates on the processor, and detects that the data is updated by a malicious program, when a decrease amount of the duplication rate exceeds a duplication rate threshold value relating to the detected change in duplication rate.

According to the present invention, it is possible to detect, without executing the compression processing for the data, the update of the data by the malicious program when the decrease amount of the duplication rate exceeds the duplication rate threshold value.

Purposes, configurations, and effects other than those in the description given above become apparent from the following description regarding embodiments.

BRIEF DESCRIPTION OF THE DRAWINGS

FIG. 1 is a block diagram for illustrating an overall configuration example of a storage system according to a first embodiment of the present invention;

FIG. 2 is a diagram for illustrating a duplication rate according to the first embodiment of the present invention;

FIG. 4 is a configuration diagram for illustrating an example of a duplication state management table according to the first embodiment of the present invention;

FIG. 5 is a configuration diagram for illustrating an example of a duplicated chunk determination table according to the first embodiment of the present invention;

FIG. 6 is a configuration diagram for illustrating an example of an operation log list according to the first embodiment of the present invention;

FIG. 7 is a flowchart for illustrating an example of user input/output (I/O) processing according to the first embodiment of the present invention;

FIG. 8 is a flowchart for illustrating an example of file update processing according to the first embodiment of the present invention;

FIG. 9 is a flowchart for illustrating an example of duplication detection processing according to the first embodiment of the present invention;

FIG. 10 is a flowchart for illustrating an example of ransomware detection processing according to the first embodiment of the present invention;

FIG. 14 is a flowchart for illustrating an example of the ransomware detection processing according to the second embodiment of the present invention;

FIG. 16 is a configuration diagram for illustrating an example of a duplication state management table according to the third embodiment of the present invention;

FIG. 17 is a configuration diagram for illustrating an example of an operation log list according to the third embodiment of the present invention;

FIG. 18 is a flowchart for illustrating an example of block I/O processing according to the third embodiment of the present invention;

FIG. 19 is a flowchart for illustrating an example of block update processing according to the third embodiment of the present invention;

FIG. 20 is a flowchart for illustrating an example of the duplication detection processing according to the third embodiment of the present invention.

DESCRIPTION OF THE PREFERRED EMBODIMENTS

Figure 3:
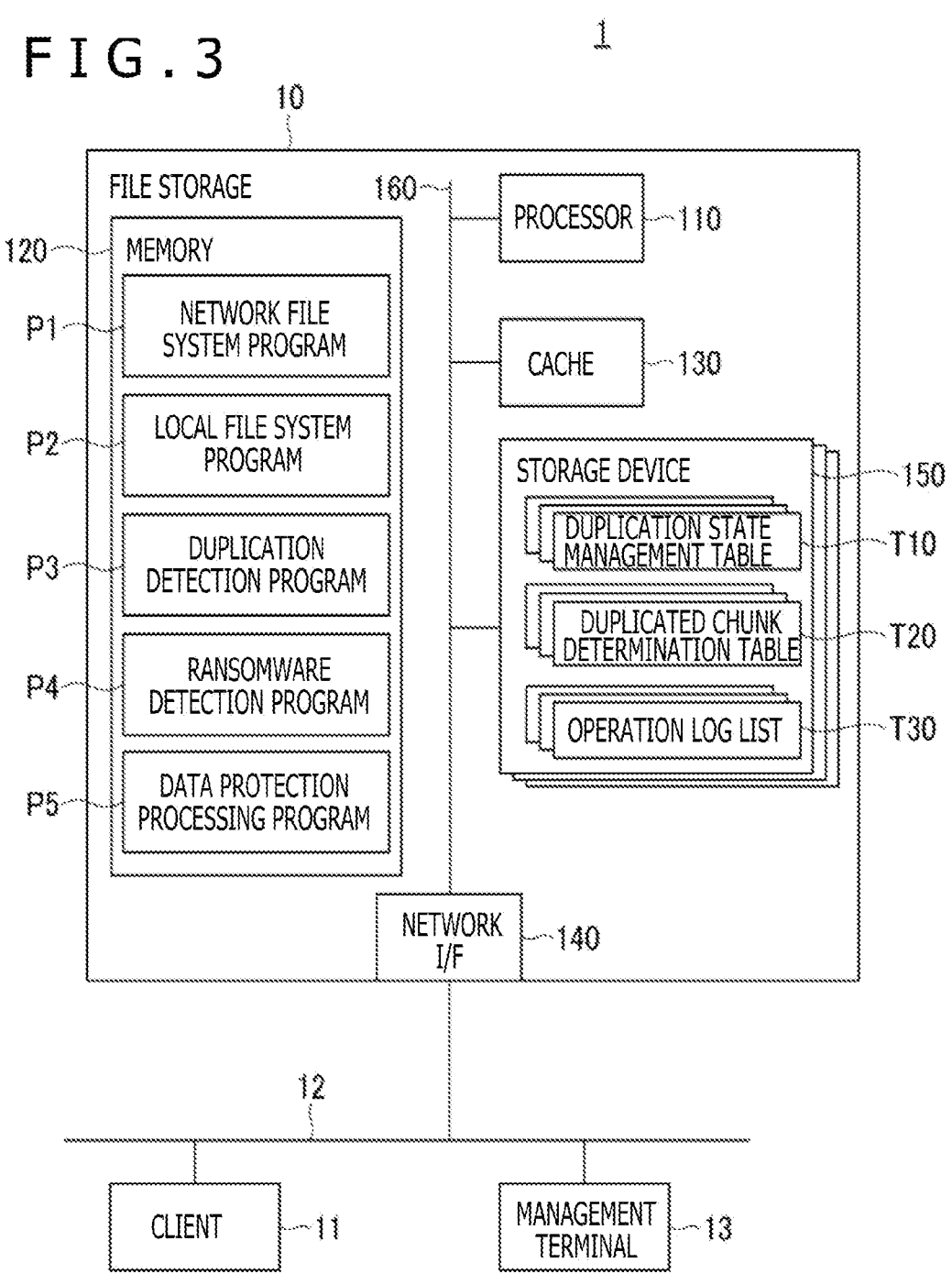
FIG. 3 is a block diagram for illustrating an overall configuration example of a computer system according to the first embodiment of the present invention.

A description is now given of embodiments of the present invention with reference to the accompanying drawings. Components having substantially identical functions or configurations in the present description and the drawings are given identical reference signs to omit redundant description.

First Embodiment

FIG. 1 is a block diagram for illustrating an overall configuration example of a storage system 1 according to a first embodiment. In FIG. 1, an overview of processing of executing ransomware detection by a file storage 10 according to the first embodiment is illustrated. Ransomware is a type of a malicious program which encrypts files stored in the file storage 10 and brings the files into a state in which a user cannot read the files. Thus, the encryption of the files by the ransomware is also referred to as an "attack by ransomware." As the malicious program, in addition, programs which destruct files or execute updates not intended by a user are included.

The storage system 1 includes the file storage 10 and a client 11. The storage system 1 has a function of executing the ransomware detection and monitoring a decrease in duplication rate in units of a file. The storage system 1 determines presence or absence of the ransomware in reference to the decrease in duplication rate of a single file. Note that the storage system 1 may also determine the presence or absence of the ransomware in units of a set of files (for example, a directory or a file type).

The client 11 updates data accumulated in the file storage 10. The client 11 is an example of a client device used by the user. On the client 11, both a usual program and the ransomware may operate. In the following description, a personal computer (PC) which is infected by the ransomware and a PC which is not infected by the ransomware are not distinguished from each other and are referred to as clients 11.

The file storage 10 includes a network file system program P1, a local file system program P2, a duplication detection program P3, a ransomware detection program P4, a data protection processing program P5 (see FIG. 3), and an operation log list T30.

A description is now given of an overview of types of operation managed in the file storage 10 and a method of detecting the ransomware.

(1) Rename & Write Operations (2) Writing of Operation Log

When the network file system program P1 receives, from the client 11, a file I/O request being an operation on the file, the network file system program P1 writes, in the operation log list T30, a log of an I/O operation (referred to as an operation log) executed by the local file system program P2. The file I/O request includes a Rename operation which changes a name of a file (an example of data) and a Write operation which writes data to a file and updates data. The local file system program P2 is a program existing at a lower level of the network file system program P1 and receives an instruction from the network file system program P1 to write the operation log to the operation log list T30. Note that the network file system program P1 may write the operation log to the operation log list T30.

The ransomware executes the Rename operation on all of the files stored in the file storage 10. Moreover, the ransomware encrypts all of data or a part of the data in the file. For example, a file having an original name of "fileA.txt" is Renamed to "fileA.txt.aaa." Similarly, a file having an original name of "fileB.txt" is Renamed to "fileB.txt.aaa." At the time of the Rename, an extension unique to the ransomware may be added. Moreover, the encryption is executed by the ransomware, and hence, the network file system program P1 can only recognize the encryption as the Write processing. Thus, the encryption processing by the ransomware is recorded as Write in the operation log list T30.

(3) Detection of Ransomware in Reference to Number of Files Having Decreased Duplication Rates The processor 110 operates thereon the duplication detection program P3 (an example of a duplication detection section) which deduplicates duplicated data, stores the deduplicated data in the storage device, calculates the duplication rate being a rate of duplicated data in a predetermined unit of storage, and detects a change between a duplication rate before an update of the data and a duplication rate after the update of the data in units of the predetermined unit of storage. For example, the duplication detection program P3 executes duplication detection processing for updated file data when the unit of storage is each file or each directory. The duplication of a file is an index focusing on a fact that, for example, when focus is placed on a certain file, this file before the update and this file after the update have the same content other than an updated portion. In the duplication detection processing, when the same pieces of data are detected in a certain period of time in units of a block obtained by dividing the file data, these same pieces of data are unified as a duplicated portion. After that, a ratio of the duplicated portions to the original file data is calculated as the duplication rate. For example, the extent of duplication between contents of the data written in the file before update and contents of the data written in the file after the update is represented by the duplication rate.

FIG. 2 is a diagram for illustrating the duplication rate. On an upper side of FIG. 2, an example of the file before the update is illustrated. The entire data of the file is not rewritten in usual user processing, and hence, for a file originally having a high duplication rate, it is predicted that an updated file by the usual user processing also has a high duplication rate. That is, it is considered that the duplication rate changes little before and after the update of the file. Meanwhile, the ransomware encrypts the data, and hence, the contents of the file are completely different before and after the encryption. Thus, the duplication rate decreases to nearly 0%.

Thus, the duplication detection program P3 compares the duplication rates before and after the update of the file and checks whether or not a decrease in duplication rate is equal to more than a threshold value. When a variation caused by a usual update is approximately 20%, the decrease amount threshold value of the duplication rate is set to, for example, 30%. The decrease amount threshold value of the duplication rate may be set in consideration of the method of use by a user, a file type, a time-series change, and the like and is not required to be determined uniquely.

A file after the update illustrated on a lower left side of FIG. 2 has a duplication rate of 90% with respect to the file before the update, and hence 10% being a variation of the duplication rate is less than 30% being the decrease amount threshold value of the duplication rate. Thus, it is considered that the file after the update has been updated by the usual user processing. Meanwhile, a file after the update illustrated on a lower right side of FIG. 2 has a duplication rate of 5%, and hence the variation of the duplication rate is 95%, which exceeds 30% being the decrease amount threshold value of the duplication rate. Thus, it is considered that the contents of the file after the update have been changed by the ransomware.

Note that the decrease amount of the duplication rate that can be determined to be caused by the attack on the file by the ransomware has diverse variations.

For example, when the duplication rate of a file decreases from 60% to 20%, the decrease amount of the duplication rate is 40%, which is larger than 30% being the decrease amount threshold value of the duplication rate, and hence, the ransomware detection program P4 can detect the attack on the file by the ransomware.

Moreover, when the duplication rate of a file decreases from 20% to 1%, the decrease amount of the duplication rate is less than 30%, but the ransomware detection program P4 considers this decrease as an abnormal state and thus detects the attack on the file by the ransomware.

Description is continued with reference to FIG. 1 again.

The duplication detection program P3 detects that the duplication rate of "fileA.txt.aaa" has decreased from 40.0% being a duplication rate in the usual user processing to 0.1% in the processing described in (3). Similarly, the duplication detection program P3 detects that the duplication rate of "fileB.txt.aaa" has decreased from 50.0% being a duplication rate in the usual user processing to 0.1%. The duplication detection program P3 outputs information on the files having the decreased duplication rates to the ransomware detection program P4.

(4) Detection of Ransomware in Reference to Rename and Write Operations

The processor 110 operates thereon the ransomware detection program P4 (an example of a malicious program detection section) which detects that data is updated by the ransomware when the decrease amount of the duplication rate exceeds the duplication rate threshold value relating to the change in duplication rate detected by the duplication detection program P3. For example, the ransomware detection program P4 detects the ransomware in reference to information periodically read from the operation log list T30 and the information on the files with decreased duplication rates output from the duplication detection program P3. Thus, the ransomware detection program P4 detects whether or not the attack by the ransomware is going on, according to the number of files each having a decrease in duplication rate equal to or more than the duplication rate threshold value in a certain period of time and data sizes of the updated data.

Moreover, the ransomware sometimes encrypts only a part of the file data in order to reduce an encryption processing time of all files. In this case, the number of Write requests is small, and hence, the storage system may not be able to detect the ransomware. Thus, the ransomware detection program P4 can also detect whether or not the attack by the ransomware is going on, according to the number of files Renamed in a certain period of time and data sizes of the updated data. Note that the capability of the ransomware detection program P4 of detecting the update or the attack on the data by the ransomware is equivalent to the detection of the ransomware.

FIG. 3 is a block diagram for illustrating an overall configuration of a computer system according to the first embodiment. FIG. 3 illustrates a hardware configuration of the storage system 1 illustrated in FIG. 1.

The file storage 10 is connected to the client 11 and a management terminal 13 via a network 12. The network 12 is, for example, a local area network (LAN) or a wide area network (WAN). Moreover, the management terminal 13 acquires a result of execution of each program stored in a memory 120 and manages a state of the file storage 10.

The file storage 10 is an example of a file storage which manages data as a file (content). The file storage 10 includes a processor 110, a memory 120, a cache 130, a network interface (I/F) 140, and a storage device 150. They are mutually connected via a communication path, for example, a bus 160.

The file storage 10 may not be a single file storage and may be a distributed file storage formed of a plurality of file storages. Moreover, an external block storage may be used as the storage device 150, and a plurality of file storages may be connected.

The processor 110 executes the programs stored in the memory 120 and processes data input to and output from the storage device 150, to thereby execute operation control for the file storage. The memory 120 is, for example, a random access memory (RAM), and temporarily stores programs and data used for the operation control to be performed by the processor 110.

In the memory 120, the network file system program P1, the local file system program P2, the duplication detection program P3, the ransomware detection program P4, and the data protection processing program P5 are stored. Note that these programs stored in the memory 120 may be stored in the storage device 150. The duplication rate before the update described before is recorded in the storage device 150. Note that the duplication rate before the update may be held on the memory 120.

The network file system program P1 is executed by the processor 110 and receives various requests such as the Read and the Write from the client 11 and the like to process a protocol included in this request. For example, the network file system program P1 processes protocols such as the Native-Client, the Filesystem in User Space (FUSE), the Network File System (NFS), and the Server Message Block (SMB).

The local file system program P2 is executed by the processor 110 and provides, to the network file system program P1, a content storage such as a file system and an object storage.

The duplication detection program P3 is executed by the processor 110 and applies, inline or as a post process, the duplication detection processing to content of the user stored in the storage device 150. The duplication detection program P3 may execute not only the duplication detection, but also deduplication. Deduplication is processing of keeping only one file of a plurality of files having the same contents (for example, files obtained only by copy and paste). As a unit for detection of the duplication by the duplication detection program P3, a unit having a fixed length and a unit having a variable length are assumed in addition to the file as a unit. Moreover, the deduplication is applied to a region in which the data update has occurred. Thus, even when a file name of a deduplicated file is changed, the deduplication processing is not applied to this file.

The ransomware detection program P4 is executed by the processor 110 to execute the ransomware detection processing described before.

The processor 110 operates, on the processor 110, the data protection processing program P5 (an example of a protection processing section) which executes protection processing for the data updated by the ransomware and detected by the ransomware detection program P4. As the protection processing applied by the data protection processing program P5 to the data, there exists, for example, processing of restricting data input to and output from an attacked file in usual user processing. Moreover, the data protection processing program P5 may apply the protection processing to a file to which the ransomware has not executed the file update. For example, processing of restricting, by the data protection processing program P5, access of the client 11 to other data to prevent damage by the ransomware from spreading is assumed. The damage by the ransomware can be stopped by the data protection processing. The data protection processing program P5 may have a function of removing the ransomware.

The cache 130 is, for example, a RAM and temporarily stores data Written from the client 11 and data read out from the storage device 150.

The network I/F 140 is an interface, for example, a wired LAN card or a wireless LAN card, and communicates with another device (for example, the client 11) via the network 12.

The storage device 150 is, for example, a hard disk or a flash memory and stores various kinds of content including content used by the user of the client 11. As the content, objects are assumed in addition to files. Moreover, when the deduplication function is implemented, it is required to store duplicated data (also referred to as a duplicated chunk). Thus, as the file, not only a user file but also a file for storing the duplicated chunk is assumed.

The storage device 150 stores duplication state management tables T10, duplicated chunk determination tables T20, and the operation log lists T30. Moreover, as the storage device 150, a block storage may be connected. The block storage may provide, to the file storage 10, a storage function of a block type, for example, a fibre channel storage area network (FC-SAN). Detailed configuration examples of the duplication state management table T10, the duplicated chunk determination table T20, and the operation log list T30 are described with reference to FIG. 4 to FIG. 6.

FIG. 4 is a configuration diagram for illustrating an example of the duplication state management table T10 according to the first embodiment.

The duplication state management table T10 is a table which manages a duplication state of data for each unit of storage (for example, each file). The duplication state management table T10 is provided for each file system of the file storage 10. The duplication state management table T10 includes an entry for each file. A duplication rate for each file and a duplication state of each of partial regions in the file are managed by the duplication state management table T10. An entry of the duplication state management table T10 includes a file Identity (ID) C11, a duplication rate C12, and a field group (C13 to C16) for each chunk in the file corresponding to the entry. Each piece of information stored in the field of each entry is also referred to as management information.

In the file ID C11, an ID (file ID) of a file corresponding to an entry is stored.

In the duplication rate C12, the duplication rate of the file having the file ID C11 is stored. The duplication rate may be obtained by a calculation formula of the number of chunks having detected duplication/the number of all chunks or a calculation formula of a total size of regions having detected duplication/a file size.

Note that, when a file before the update is updated by the client 11, this file is overwritten and becomes a file after the update. Note that the duplication rate before the update is recorded in the duplication rate C12, and hence, when the duplication detection program P3 detects the duplication rate of the file after the update, the ransomware detection program P4 can detect the ransomware according to a change in the duplication rate.

The field group for each chunk includes fields being an intra file offset C13, a post-duplication determination processing flag C14, a duplication state C15, and a fingerprint C16.

In the intra file offset C13, a start position of content of a chunk corresponding to the field group is stored. The chunks are obtained by dividing data such that each h chunk has a predetermined length. It is assumed that the chunk is a unit having a fixed length of 4 k bytes, but may be obtained by dividing data in such a manner as to have a variable length. When the chunk has a variable length, the data is divided into the chunks having variable lengths by the rolling hash processing or the like being applied thereto.

In the post-duplication determination processing flag C14, a post-duplication determination processing flag indicating whether or not duplication determination processing has been applied to the chunk corresponding to the field group is stored. The post-duplication determination processing flag is set to False when the data in the chunk is updated and is set to True after the duplication determination processing is performed.

In the duplication state C15, a state of the chunk corresponding to the field group is stored. As the state of the chunk, there exist "not duplicated" indicating that the chunk for which the duplication state is to be determined is not duplicate with another chunk stored in the file storage 10 and "duplicated" indicating that the chunk is duplicate with another chunk. The duplication detection program P3 calculates the change in duplication rate for data having "not duplicated" stored in the duplication state management table T10. Note that it is assumed that "not duplicated" is stored until the duplication detection program P3 starts the duplication determination for the chunk, but another state may be stored in the duplication state C15.

In the fingerprint C16, a fingerprint of the chunk corresponding to the field group is stored. The fingerprint is a value obtained by applying a hash function to the data of the chunk and is used to check identity (duplication) of the chunk. As a method for calculating the fingerprint, for example, the message digest algorithm 5 (MD5), the Secure Hash Algorithm 1 (SHA-1), and the like may be used. The fingerprint is set at the time of the duplication determination processing by the duplication detection program P3.

FIG. 5 is a configuration diagram for illustrating an example of the duplicated chunk determination table T20 according to the first embodiment.

The duplicated chunk determination table T20 is a table for storing information used for the duplication determination for the chunks in the file storage 10. The duplicated chunk determination table T20 stores the fingerprints generated in line with the offsets of data managed in the duplication state management table T10 and the numbers of chunks. For example, in the duplicated chunk determination table T20, the fingerprints of all data in the file storage 10 and the numbers of chunks having the same fingerprints are stored. An entry of the duplicated chunk determination table T20 includes fields being a fingerprint C21 and the number of chunks C22.

In the fingerprint C21, the fingerprint of the chunk of the file is stored.

In the number of chunks C22, the number of chunks having the same fingerprint C21 is stored. When there exist three chunks having the same data, the duplication rate of each chunk is 100%.

As described later, the duplication detection program P3 calculates, in reference to the duplication state management table T10, the fingerprint of a chunk for which the duplication state is not determined. When the fingerprint of the chunk for which the duplication state is to be determined matches the fingerprint stored in the duplicated chunk determination table T20, the duplication detection program P3 increments the number of chunks of the chunk having the fingerprint matching the calculated fingerprint. Meanwhile, when the calculated fingerprint does not match the fingerprints stored in the duplicated chunk determination table T20, the duplication detection program P3 adds the calculated fingerprint to the duplicated chunk determination table T20. After that, the duplication detection program P3 calculates the duplication rate in reference to the number of chunks.

FIG. 6 is a configuration diagram for illustrating an example of the operation log list T30 according to the first embodiment.

The operation log list T30 stores an entry (operation log) for each operation executed by the client 11 on the data (file). In the operation log list T30, not only the operations of Create (create), the Write (update), and the Remate (rename) on a file, but also the execution of the duplication determination on this file is recorded. The operation log list T30 includes fields being an operation type C31, a file handler C32, a type C33, an Offset C34, a Length C35, a Flag C36, and a Timestamp C37. The newest operation log (entry) is added to the bottom of the operation log list T30.

In the operation type C31, an operation type corresponding to an entry is stored. As the operation type, for example, the Create (create), the Write (update), the Rename (rename), and the duplication determination exist. When the duplication detection program P3 makes the duplication determination, a decrease in duplication rate is determined. The usual write processing applied to a file through the client 11 by the user and the write processing applied to a file by the ransomware through the client 11 are all recorded as the Write in the operation type C31. Note that there may be imposed such a limitation that only the Write (update), the Rename (rename), and the duplication determination are stored in the operation type C31.

In the file handler C32, a file hander of a file being an operation target corresponding to the entry is stored. Different values are stored in the file handlers for the same operation type such as each of the Rename and the Write, and this is because operations on a plurality of files by the ransomware are executed simultaneously.

In the type C33, a type of the operation target corresponding the entry, that is, a value indicating a file or a directory, is stored.

In the Offset C34, a start position of a portion of the file being the target of the operation corresponding to the entry is stored.

In the Length C35, a size of the portion being the target of the operation corresponding to the entry is stored. Values are not stored in the Offset C34 and the Length C35 for the duplication determination processing.

The Flag C36 includes information (for example, True) on the detection of the decrease amount of the duplication rate exceeding the duplication rate threshold value in the duplication determination operation by the duplication detection program P3 as the operation type concerning the data. When the decrease amount of the duplication rate is equal to or larger than the threshold value, True is stored. When the decrease amount of the duplication rate is smaller than the threshold value, False is stored. In a case of other operations, a value is not stored. The ransomware detection program P4 refers to the operation log list T30 and detects an update of data by the ransomware, according to the operation logs. For example, when the number of entries storing True in the Flag C36 is large for the duplication determination in the operation type C31, the number of files each having a decreased duplication rate is large, and hence the ransomware detection program P4 can detect the attack by the ransomware, that is, the ransomware.

In the Timestamp C37, each of timestamps T0, T1, . . . indicating times at which the operation corresponding to the entry was executed is stored. By the timestamps, the number of rename operations and the number of write operations executed in a certain period of time (for example, 0:00 to 0:10) are revealed.

<Examples of Processing Operation of File Storage>

Details of examples of the processing operations of the file storage 10 according to the present embodiment are next described with reference to FIG. 7 to FIG. 10. The processing illustrated in FIG. 7 to FIG. 10 is an example of a malicious program detection method used in the storage system 1 including the processor 110 for processing the data input to and output from the storage device 150. The processing in each drawing is executed by each program operating on the processor 110.

FIG. 7 is a flowchart for illustrating an example of user I/O processing according to the first embodiment.

User I/O processing S100 is started by the processor 110 executing the network file system program P1 and the local file system program P2 in the file storage 10. A user I/O request is read as a request for a file/directory operation directed to the file storage 10 and is described so in the flowchart. The file/directory operation includes, in addition to the Rename operation and the Write operation executed by the client 11 on a file as described before, an operation of newly creating a directory by the client 11.

When the network file system program P1 receives the user I/O request from the client 11 (S101), the network file system program P1 executes protocol processing and requests the local file system program P2 to execute the user I/O operation. As described before, both the usual program and the ransomware possibly operate on the client 11.

After that, the local file system program P2 executes the file/directory operation requested by the network file system program P1 (S102). Details of the file/directory operation is described in file update processing of FIG. 8 described later.

After that, the local file system program P2 adds a content of the executed file/directory operation to the operation log list T30 (S103) and ends the user I/O processing (S199).

FIG. 8 is a flowchart for illustrating an example of the file update processing according to the first embodiment.

File update processing S200 is a type of the file/directory operation executed in Step S102. The file update processing S200 is executed by the processor 110 executing the local file system program P2 in the file storage 10.

The local file system program P2 checks the duplication state management table T10 and determines whether or not the duplication determination processing has been applied to a chunk corresponding to an update region (S201). In this processing, when the post-duplication determination processing flag C14 of the duplication state management table T10 is True, it is determined that the duplication determination processing has been applied to the chunk corresponding to the update region. When the chunk subjected to the duplication determination processing is included in the duplication state management table T10 (YES in S201), the local file system program P2 transitions to Step S202, and when the chunk subjected to the duplication determination processing is not included (NO in S201), the local file system program P2 transitions to Step S203.

In Step S201, when the local file system program P2 determines that the chunk corresponding to the update region has been subjected to the duplication determination processing, the local file system program P2 acquires the fingerprint C16 of the chunk subjected to the duplication determination processing from the duplication state management table T10 and subtracts 1 from the number of chunks C22 in the duplicated chunk determination table T20 (S202). Note that, when the number of chunks C22 in the duplicated chunk determination table T20 is 0, the local file system program P2 may delete this entry.

When the local file system program P2 determines that the chunk has not been subjected to the duplication determination processing in Step S201 or after Step S202, the local file system program P2 writes an update content to a target region (not illustrated) of the file storage 10 in reference to the requested file update, and reflects the update content to the target region (S203). The target region is a region the data update of which is requested by the client 11.

After that, the local file system program P2 changes the post-duplication determination processing flag C14 in the duplication state management table T10 of the chunk corresponding to the update region to False, to update the management information on the update state (S204), and ends the file update processing (S299). Note that, when the determination of NO is made in Step S201, the post-duplication determination processing flag C14 may be updated from False to False.

When the post-duplication determination processing flag C14 is changed to False in Step S204, the duplication detection program P3 executes the duplication detection for data specified by the intra file offset C13 of this entry in subsequent processing. Moreover, at an end time of the file update processing, the duplication rate C12 in the duplication state management table T10 is not updated.

FIG. 9 is a flowchart for illustrating an example of the duplication detection processing according to the first embodiment.

Duplication detection processing S300 is executed by the processor 110 executing the duplication detection program P3 in the file storage 10. The duplication detection program P3 checks the operation log list T30 and makes the duplication determination for a file to which the data update has been applied. The duplication detection processing S300 indicates the duplication detection processing in a certain file. The duplication detection program P3 is periodically executed.

First, the duplication detection program P3 acquires the management information in the duplication state C15 of the target file from the duplication state management table T10 (S301).

Moreover, the duplication detection program P3 acquires, simultaneously with the start of this processing, the management information in the duplication rate C12 of the target file from the duplication state management table T10 and writes the management information in a predetermined region of the storage device 150.

After that, the duplication detection program P3 checks the information on the next chunk sequentially from the top of the duplication state management table T10 (S302). In this processing, the duplication detection program P3 sequentially increases the offset from 0 of the intra file offset C13 and checks the corresponding chunk.

After that, the duplication detection program P3 checks the post-duplication determination processing flag C14 of this chunk and checks whether or not this chunk has not been subjected to the duplication determination (S303). When the duplication processing has not been performed (False) (NO in S303), the duplication detection program P3 transitions to Step S304. When the duplication determination processing has been performed (True) (YES in S303), the duplication detection program P3 transitions to Step S308.

When this chunk has not been subjected to the duplication processing (False) (NO in S303), the duplication detection program P3 calculates the fingerprint of the target chunk (S304). The fingerprint is the value obtained by applying the hash function to the data of the chunk and is used to check the identity (duplication) of the chunk. As a method of calculating the fingerprint by the duplication detection program P3, for example, the MD5 or the SHA-1 may be used.

After that, the duplication detection program P3 checks the duplicated chunk determination table T20 and checks whether or not there is an entry including a fingerprint C21 having the same value as the fingerprint calculated in Step S304 and thus matching this fingerprint (S305). When there is an entry having a matching fingerprint (YES in S305), the duplication detection program P3 transitions to Step S306. When there is no entry having a matching fingerprint (NO in S305), the duplication detection program P3 transitions to Step S307.

When there is an entry having a matching fingerprint (YES in S305), the duplication detection program P3 adds one to the number of chunks of this entry in the duplicated chunk determination table T20 (S306). When there is no entry having a matching fingerprint (NO in S305), the duplication detection program P3 adds, to the duplicated chunk determination table T20, an entry having the fingerprint calculated in Step S304 and 1 in the number of chunks (S307).

After Step S306, after S307, or when the determination of YES is made in Step S303, the duplication detection program P3 updates the duplication state management table T10 (S308). For example, the duplication detection program P3 changes the post-duplication determination processing flag C14 in the duplication state management table T10 of the target chunk to post-determination (True) and changes the fingerprint C16 thereof to the fingerprint calculated in Step S304. Moreover, when the same fingerprint exists in Step S305, the duplication detection program P3 changes the duplication state C15 to "duplicated." When the same fingerprint does not exist, the duplication detection program P3 changes the duplication state C15 to "not duplicated."

After that, the duplication detection program P3 determines whether or not the target chunk is a terminal chunk (S309). When the target chunk is the terminal chunk (YES in S309), the duplication detection program P3 transitions to Step S310. When the target chunk is not the terminal chunk (NO in S309), the duplication detection program P3 transitions to Step S302.

When the target chunk is a terminal chunk (YES in S309), the duplication detection program P3 checks the duplication states C15 in the duplication state management table T10 of the target file and calculates the duplication rate in units of the file (S310). The duplication detection program P3 may obtain the duplication rate as the number of chunks having the detected duplication/the number of all chunks or as the total size of regions having the detected duplication/the file size.

After that, the duplication detection program P3 compares the previous duplication rate stored in the storage device 150 and the duplication rate calculated in Step S310 with each other and determines whether or not the duplication rate has decreased by an amount equal to or larger than the duplication rate threshold value (S311). When the duplication rate has decreased by an amount equal to or larger than the duplication rate threshold value (YES in S311), the duplication detection program P3 transitions to Step S312. When the duplication rate has not decreased by an amount equal to or larger than the duplication rate threshold value (NO in S311), the duplication detection program P3 transitions to Step S313.

When the duplication rate has decreased by an amount equal to or larger than the duplication rate threshold value (YES in S311), the duplication detection program P3 additionally writes, in the operation log list T30, that a decrease in duplication rate exists (S312). The additional writing of the existence of the decrease in duplication rate is executed by the duplication detection program P3 adding an entry having the duplication determination in the operation type C31 and True in the Flag C36 in the operation log list T30.

When the duplication rate has not decreased by an amount equal to or larger than the duplication rate threshold value (NO in S311), the duplication detection program P3 additionally writes, in the operation log list T30, that a decrease in duplication rate does not exist (S313). The additional writing of the absence of the decrease in duplication rate is executed by the duplication detection program P3 adding an entry having the duplication determination in the operation type C31 and False in the Flag C36 in the operation log list T30.

After Step S312 or S313, the duplication detection program P3 executes update processing for the duplication rate of changing the duplication rate C12 in the duplication state management table T10 of the target file to the duplication rate calculated in Step S310 (S314) and ends the duplication detection processing (S399).

FIG. 10 is a flowchart for illustrating an example of the ransomware detection processing according to the first embodiment.

Ransomware detection processing S400 is executed by the processor 110 executing the ransomware detection program P4 in the file storage 10. The ransomware detection processing is periodically executed to determine whether or not the file storage 10 is being attacked by the ransomware.

First, the ransomware detection program P4 acquires the operation logs in a certain period of time (for example, a period of time such as 30 minutes or one hour) from the operation log list T30 (S401).

After that, the ransomware detection program P4 calculates the total number of Renamed files from the operation logs (S402). Only whether the Rename operation has been executed on a certain file is important, and hence, it is not required to count the Rename operation performed a plurality of times on the same file.

After that, the ransomware detection program P4 calculates the total updated data (overwriting existing data) size in reference to the operation logs (S403). Note that the ransomware does not update the same region for a plurality of times, and hence it is not required to count the update performed a plurality of times on the same region.

After that, the ransomware detection program P4 calculates the total number of files each having a decreased duplication rate (total number of duplication rate decreases) from the operation logs (S404).

After that, the ransomware detection program P4 checks whether or not the total number of Renamed files exceeds a number-of-files threshold value (S405). In this state, the ransomware detection program P4 sets a threshold value relating to the number of rename operations as the number-of-rename-operations threshold value and can detect the update of the data by the ransomware when the number of rename operations stored in the operation log list T30 in the certain period of time exceeds the number-of-rename-operations threshold value. Thus, when the total number of Renamed files exceeds the number-of-files threshold value (YES in S405), the ransomware detection program P4 transitions to Step S408. When the total number of Renamed files does not exceed the number-of-files threshold value (NO in S405), the ransomware detection program P4 transitions to Step S406.

After that, the ransomware detection program P4 checks whether or not the total updated data size exceeds a data size threshold value (S406). In this state, the ransomware detection program P4 sets a threshold value relating to the data size of the data updated by the write operation as the data size threshold value and detects the update of the data by the ransomware when the data size of the data updated by the write operation and stored in the operation log list T30 in the certain period of time exceeds the data size threshold value. Thus, when the total updated data size exceeds the data size threshold value (YES in S406), the ransomware detection program P4 transitions to Step S408. When the total updated data size does not exceed the data size threshold value (NO in S406), the ransomware detection program P4 transitions to Step S407.

After that, the ransomware detection program P4 checks whether or not the total number of duplication rate decreases exceeds a number-of-decreases threshold value (S407). In this state, the ransomware detection program P4 sets a threshold value relating to the number of decrease amounts of the duplication rate each exceeding the duplication rate threshold value as the number-of-decreases threshold value and detects the update of the data by the ransomware when the number of decrease amounts of the duplication rate each exceeding the duplication rate threshold value and being stored in the operation log list T30 in the certain period of time exceeds the number-of-decreases threshold value. Thus, when the total number of duplication rate decreases exceeds the number-of-decreases threshold value (YES in S407), the ransomware detection program P4 transitions to Step S408. When the total number of duplication rate decreases does not exceed the number-of-decreases threshold value (NO in S407), the ransomware detection program P4 transitions to Step S499.

Note that the ransomware detection program P4 determines that the attack by the ransomware is going on when any one of the values exceeds the corresponding threshold value in the check processing in Steps S405 to S407. The determination method is not limited to the case described herein and includes a case in which all of the values exceed the respective threshold values, a case in which a plurality of values exceed the respective threshold value, and a case in which a weighted sum of the values exceeds a threshold value.

After the case in which the total number of Renamed files exceeds the number-of-files threshold value (YES in S405), the case in which the total updated data size exceeds the data size threshold value (YES in S406), or the case in which the total number of duplication rate decreases exceeds the number-of-decreases threshold value (YES in S407), the ransomware detection program P4 requests the data protection processing program P5 which executes the data protection processing for the data protection processing. Moreover, the ransomware detection program P4 notifies the management terminal 13 which manages the file storage 10 of the possibility of the attack by the ransomware, that is, the detection of the ransomware (S408). A storage administrator who operates the management terminal 13 can immediately notice the attack on the file storage 10 by the ransomware and can respond to the attack.

Note that when the determination is made in any one of the pieces of the determination processing (S405, S406, and S407) illustrated in FIG. 10, the attack by the ransomware is detected. However, the ransomware detection program P4 may detect the update of the data by the ransomware according to a combination of at least two of the number of rename operations in the certain period of time, the data size of the data updated by the write operation in the certain period of time, and the number of decrease amounts of the duplication rate each exceeding the duplication rate threshold value. Moreover, the ransomware detection program P4 may weight the results of the determination processing, and the attack by the ransomware may be detected when the weighted results of the determination processing exceed a predetermined threshold value.

Moreover, the ransomware detection processing may be started at a timing at which the number times of writing of the Write operation and the Rename operation to the operation log list T30 becomes larger than a usual number.

In the storage system 1 according to the first embodiment described above, the attack by the ransomware on the file storage 10 is detected by the duplication detection program P3 detecting the duplication rates of the file before and after the update and the ransomware detection program P4 checking the decrease in the duplication rate detected in units of the file. Thus, even when the ransomware encrypts only a part of the file data and hence the number of times of Write request is small as in the conventional case, the ransomware detection program P4 detects the attack by the ransomware in a short period of time. After that, such countermeasures as the stop of the file storage 10 and the disconnection of the file storage 10 from the network 12 can be taken by the data protection processing program P5. Further, the data damaged by the ransomware can also be restored to the state before the attack by the data protection processing program P5, and hence the damage of the file storage 10 can be kept to the minimum.

The detection of the duplication rate of the file data is small in overhead of the processing compared with conventional data compression processing, and hence the performance decrease in the storage system 1 can be suppressed. Moreover, the ransomware changes the name of the encrypted file to "original file name+specific extension." Thus, even when a part of a file is encrypted by the ransomware, the ransomware detection program P4 can detect the attack by the ransomware on a file having a large number of rename operations in the certain period of time.

Moreover, in the storage system 1, the processing relating to the ransomware detection processing is lighter than the conventional processing; hence the performance decrease in the storage system 1 can be suppressed, and the detection precision of the ransomware can be increased.

Second Embodiment

A description is now given of the storage system according to the second embodiment of the present invention with reference to FIG. 11 to FIG. 14. Usually, still image data, motion image data, and compressed data all have a low duplication rate. Even when the decrease in duplication rate is detected in units of the block for these pieces of data written to the file storage, it is difficult to distinguish this decrease from the decrease in duplication rate caused by the attack by the ransomware. Thus, in the storage system according to the second embodiment, focus is placed on a file type, and a decrease in duplication rate is monitored in a case in which the unit of storage is each file type, to detect the ransomware.

Figures 11, 12:
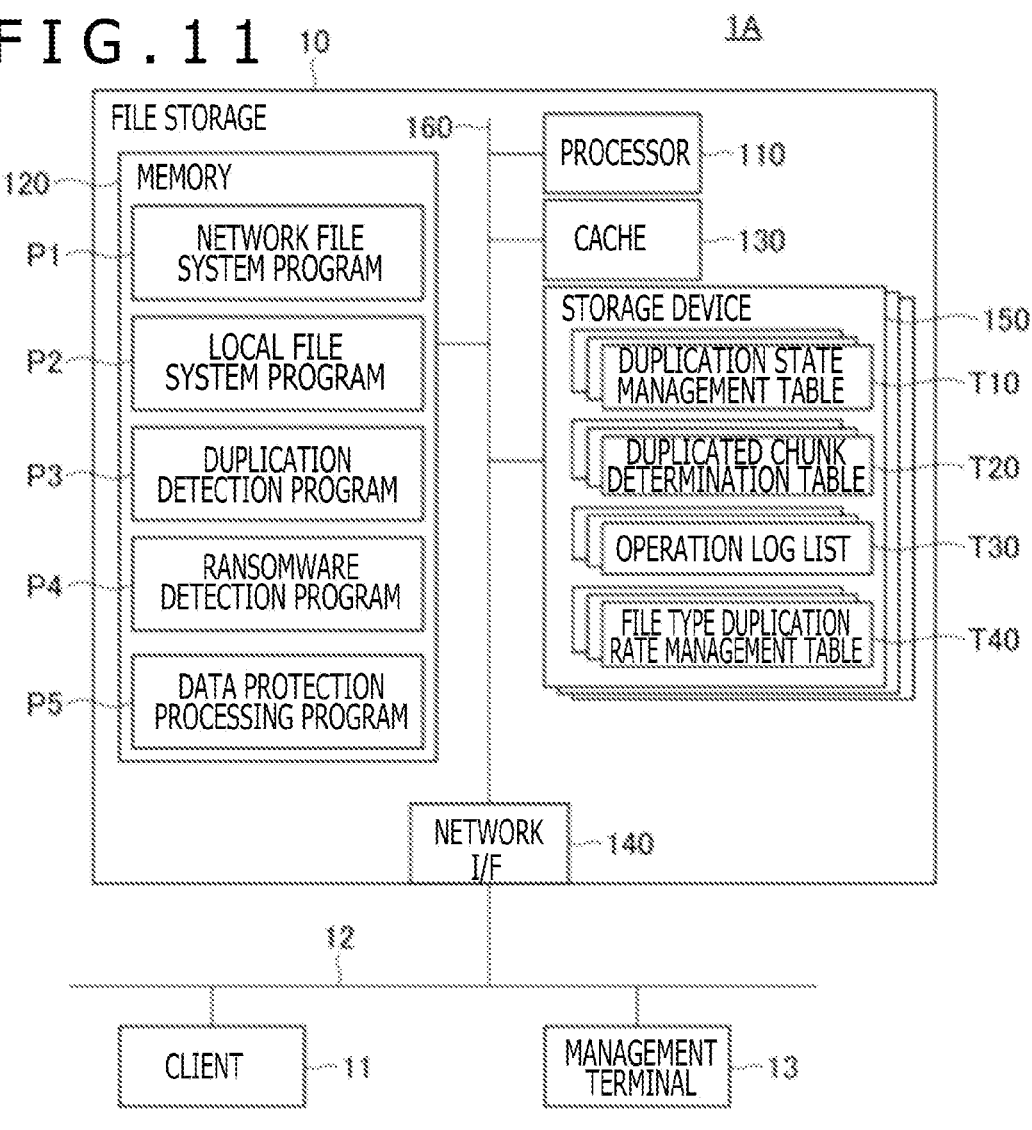
FIG. 11 is a block diagram for illustrating the overall configuration of a computer system according to a second embodiment of the present invention.
FIG. 12 is a configuration diagram for illustrating an example of a file type duplication rate management table according to the second embodiment of the present invention.

FIG. 11 is a block diagram for illustrating the overall configuration of a computer system according to the second embodiment. A point different from the computer system illustrated in FIG. 3 is that the storage device 150 also stores a file type duplication rate management table T40.

FIG. 12 is a configuration diagram for illustrating an example of the file type duplication rate management table T40 according to the second embodiment.

The file type duplication rate management table T40 is a table for storing the duplication rates before the duplication determination and after the duplication determination for each file type. An entry of the file type duplication rate management table T40 includes fields of a file type C41 and a duplicate rate C42.

In the file type C41, information on the file type is stored. The file type is a type of a file determined in reference to an extension, a header of the file, or data at a specific position. As the file type, there exist the extension of mp4 indicating motion image data, the extension of txt indicating text data, and the extension of dat indicating a data file. Moreover, the extension of zip indicating compressed data, the extension of jpeg indicating still image data, and the like may be stored in the file type C41.

In the duplication rate C42, the duplication rate in units of the file type is stored. The duplication rate may be obtained in a form of the number of chunks having the detected duplication in the same file type/the number of all chunks in the same file type, a form of a total size of the regions having the detected duplication in the same file type/the file size in the same file type, a form of the number of chunks having ever detected duplication in the same file type/the number of chunks ever determined for the duplication in the same file type, and the like. The duplication rate of the motion image data (mp4) is very low compared with those of the text data (txt) and the data file (dat) indicated in the file type C41. The duplication rates of the still image data (jpeg) and the like are also low, though not illustrated.

Note that, as the duplication rate management table, there may be provided such a configuration that the duplication rate is monitored not in units of the file type, but in units of the directory. In this case, in place of the file type C41, the directory is used in the duplication rate management table.

The storage system according to the second embodiment includes the duplication state management table T10 illustrated in FIG. 4 and the duplicated chunk determination table T20 illustrated in FIG. 5 as the tables according to the first embodiment. Note that the operation log list T30 illustrated in FIG. 6 is not required to store the log for the duplication determination operation, which is different from the first embodiment.

Moreover, the storage system according to the second embodiment executes the user I/O processing S100 illustrated in FIG. 7 and the file update processing S200 illustrated in FIG. 8 as in the processing according to the first embodiment.

Figure 13:
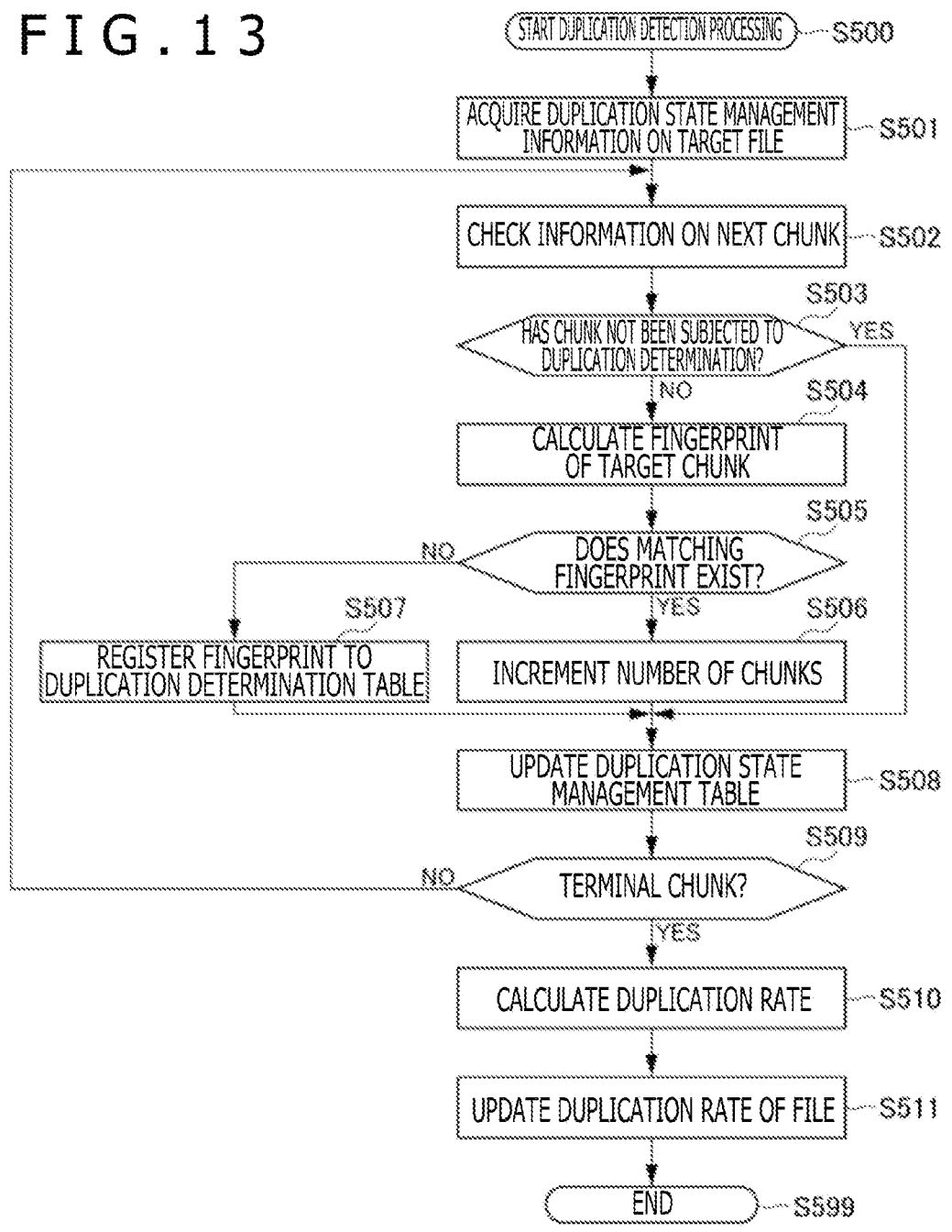
FIG. 13 is a flowchart for illustrating an example of the duplication detection processing according to the second embodiment of the present invention.

FIG. 13 is a flowchart for illustrating an example of the duplication detection processing according to the second embodiment.

Duplication detection processing S500 is executed by the processor 110 executing the duplication detection program P3 in the file storage 10. The duplication detection program P3 checks the operation log list T30 and makes the duplication determination for a file to which the data update has been applied.

Processing in Steps S501 to S510 is similar to the processing in Steps S301 to S310 of FIG. 9, and hence a detailed description is omitted. Note that, as described in Step S301, the duplication detection program P3 acquires, simultaneously with the start of this processing, the duplication rate in the duplication rate C42 of the target file type from the file type duplication rate management table T40 and writes the duplication rate in a predetermined region of the storage device 150.

The duplication detection program P3 updates the duplication rate C42 in the file type duplication rate management table T40 after the calculation of the duplication rate of the target file in Step S510 (S511) and ends the duplication detection processing (S599). The duplication detection processing S500 does not calculate the duplication rate in one file, but calculates the duplication rate for a plurality of files in one file type, and hence, the processing (S311 to S313 illustrated in FIG. 9) for each operation on the operation log list T30 is omitted.

FIG. 14 is a flowchart for illustrating an example of the ransomware detection processing according to the second embodiment. The ransomware detection processing S600 is executed by the processor 110 executing the ransomware detection program P4 in the file storage 10.

Processing in Steps S601 to S603 is similar to the processing in Steps S401 to S403 of FIG. 10, and hence a detailed description is omitted. Note that, in Step S601, a decrease in duplication rate for each file type is calculated. Thus, in Step S601, the ransomware detection program P4 acquires the operation logs in a certain period of time from the operation log list T30 and acquires the file type duplication rates in the certain period of time from the file type duplication rate management table T40. As described above, the duplication rates updated by the previous ransomware detection processing S600 are stored in the duplication rate C12 in the operation log.

The ransomware detection program P4 calculates the newest duplication rate for each file type after the calculation of the total updated data size in Step S603 (S604). For example, the ransomware detection program P4 can calculate the duplication rate for each file type in reference to the duplication rate C12 and the file size of each of files in the same file type. Thus, to the duplication state management table T10 of FIG. 4, a field for the file size is provided. Note that the duplication rate for each file type may be calculated when the duplication detection program P3 executes the duplication detection processing.

After that, the ransomware detection program P4 compares the previous duplication rate C42 for each file type and the duplication rate for each file type calculated in Step S604 with each other, to calculate the decrease in duplication rate for each file type (S605).

Processing in Step S606 and processing in S607 are similar to the processing in Step S405 and the processing in S406 of FIG. 10, respectively, and hence a detailed description is omitted.

When a determination of NO is made in Step S607, the ransomware detection program P4 checks whether or not the duplication rate decrease exceeds the duplication rate threshold value in a certain file type (S608). When the duplication rate decrease exceeds the duplication rate threshold value, the ransomware detection program P4 transitions to Step S609. When the duplication rate decrease does not exceed the duplication rate threshold value, the ransomware detection program P4 transitions to Step S610. Note that the target file types may be limited to file types each having a total size equal to or larger than a certain size.

Processing in Step S609 is similar to the processing in Step S408 of FIG. 10, and hence a detailed description is omitted.

After Step S609 or when the duplication rate decrease does not exceed the duplication rate threshold value (NO in S608), the ransomware detection program P4 updates the duplication rate C42 in the file type duplication rate management table T40 to the duplication rate for each file type calculated in Step S604 (S610) and ends the ransomware detection processing (S699).

In a file storage system 1A according to the second embodiment described above, even when the duplication rate is unique in each file type, the ransomware detection program P4 detects the ransomware when the decrease in duplication rate in the file type exceeds the duplication rate threshold value. Thus, the data protection processing by the data protection processing program P5 is promptly executed, and hence the influence of the attack on the files by the ransomware can be suppressed.

Third Embodiment

Figure 15:
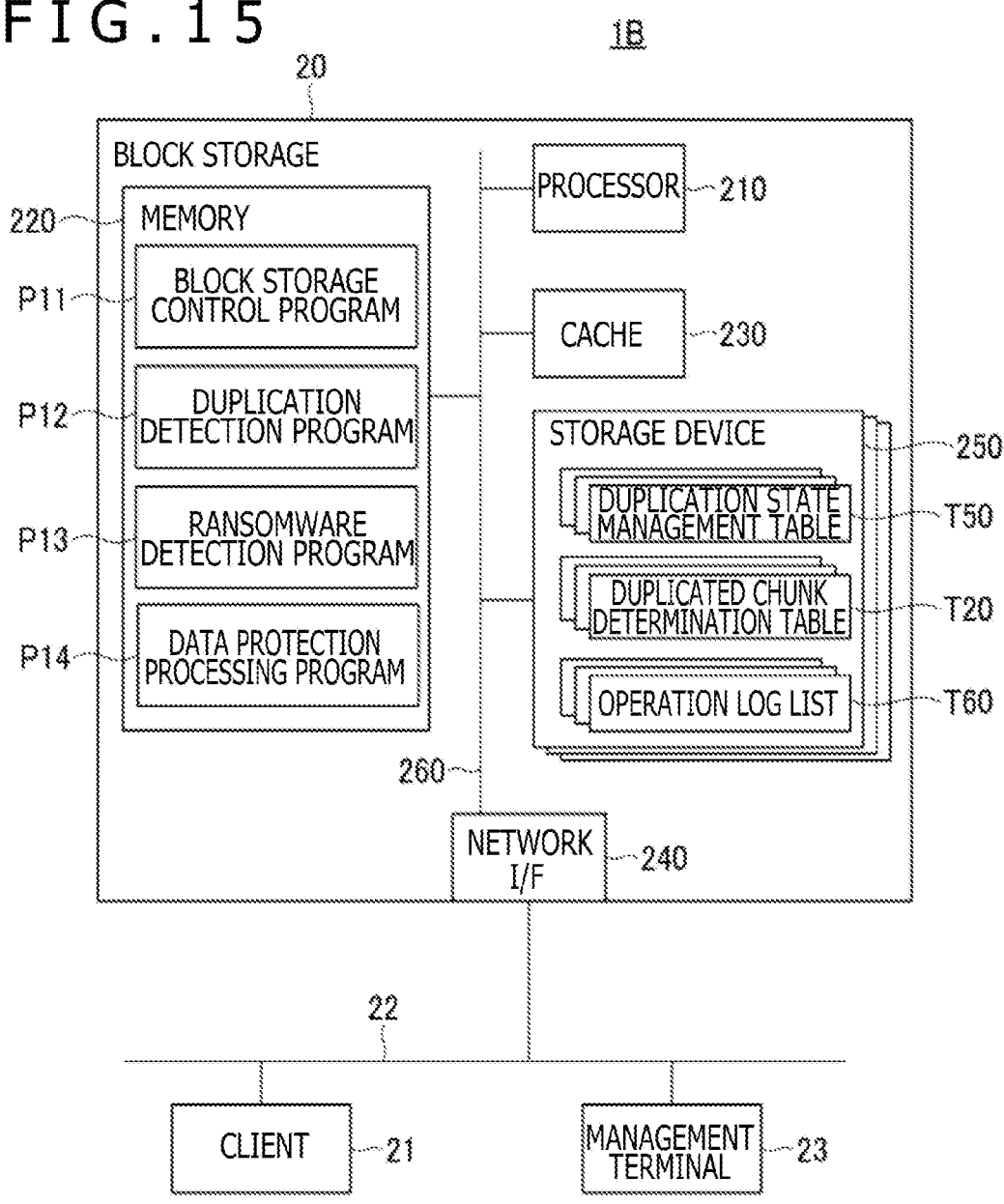
FIG. 15 is a block diagram for illustrating the overall configuration of a computer system according to a third embodiment of the present invention.

A description is now given of a storage system according to a third embodiment of the present invention with reference to FIG. 15 to FIG. 21. The storage system according to the third embodiment executes the ransomware detection in a block storage and monitors the decrease in duplication rate in a case in which the unit of storage is each volume. The block storage is a storage which does not divide data in units of the file, but divides a file in units of a block, and stores these blocks. Moreover, in the storage system according to the third embodiment, the duplication rate is monitored in units of the volume being a set of the blocks provided by the block storage. Note that the storage system may monitor the decrease in duplication rate in units of not the volume, but any size obtained by assembling the blocks. FIG. 15 is a block diagram for illustrating the overall configuration of the computer system according to the third embodiment.

A client 21 updates data accumulated in a block storage 20. The client 21 is the example of the client device used by the user. On the client 21, both the usual program and the ransomware may operate. In the following description, a PC which is infected by the ransomware and a PC which is not infected by the ransomware are not distinguished from each other and are referred to as clients 21.

The block storage 20 is connected to the client 21 and a management terminal 23 via a network 22. The network 22 is, for example, a LAN, a WAN, or a SAN.

The block storage 20 is an example of a block storage which manages data as a block. The block storage 20 may be formed of not a signal block storage, but a plurality of block storages. The block storage 20 includes a processor 210, a memory 220, a cache 230, a network I/F 240, and a storage device 250. They are mutually connected via a communication path, for example, a bus 260.

The processor 210 executes a program stored in the memory 220, to perform operation control for the file storage. The memory 220 is, for example, a RAM and temporarily stores programs and data used for the operation control performed by the processor 210.

In the memory 220, a block storage control program P11, a duplication detection program P12, a ransomware detection program P13, and a data protection processing program P14 are stored. Note that these programs stored in the memory 220 may be stored in the storage device 250.

The block storage control program P11 is executed by the processor 210 and provides a logical volume being a logical storage area based on the storage device 250 to the client 21.

The duplication detection program P12, the ransomware detection program P13, and the data protection processing program P14 have the same functions as those of the duplication detection program P3, the ransomware detection program P4, and the data protection processing program P5 illustrated in FIG. 3, and hence a detailed description is omitted.

The cache 230 is, for example, a RAM, and temporarily stores data Written from the client 21 and data read out from the storage device 250.

The network I/F 240 is an interface, for example, a wired LAN card or a wireless LAN card, and communicates with another device (for example, the client 21) via the network 22.

The storage device 250 is, for example, a hard disk or a flash memory and stores various kinds of content including content used by the user of the client 21. As the content, objects are assumed in addition to files. Moreover, as the file, not only a user file, but also a file for storing the duplicated chunk is assumed.

The storage device 250 stores duplication state management tables T50, the duplicated chunk determination tables T20, and the operation log lists T60. A description is given of detailed configuration examples of the duplication state management table T50 and the operation log list T60 with reference to FIG. 16 and FIG. 17. The configuration example of the duplicated chunk determination table T20 has already been described with reference to FIG. 5.

FIG. 16 is a configuration diagram for illustrating the example of the duplication state management table T50 according to the third embodiment.

The duplication state management table T50 includes an entry for each volume. The block storage 20 is formed as a part of a block storage system 1B and provides a block volume to the client 21. An entry of the duplication state management table T50 includes a volume ID C51, a duplication rate C52, and a field group (C53 to C56) for each chunk in the volume corresponding to the entry.

In the Volume ID C51, an ID (Volume ID) of a volume corresponding to an entry is stored.

In the duplication rate C52, a duplication rate of the volume having the Volume ID C51 is stored. The duplication rate of the volume may be obtained as the number of chunks having detected duplication/the number of all chunks or as a total size of regions having detected duplication/a volume size.

The field group for each chunk includes fields being an intra volume offset C53, a post-duplication determination processing flag C54, a duplication state C55, and a fingerprint C56. In the intra volume offset C53, a start position of a chunk corresponding to the field group in the volume is stored.

In the post-duplication determination processing flag C54, a post-duplication determination processing flag indicating whether or not duplication determination processing has been applied to the chunk corresponding to the field group is stored. The post-duplication determination processing flag is set to False when the data in the chunk is updated and is set to True after the duplication determination processing.

In the duplication state C55, a state of the chunk corresponding to the field group is stored. As the state of the chunk, there exist "not duplicated" indicating that the chunk is not duplicated with another chunk and "duplicated" indicating that the chunk is duplicated with another chunk.

In the fingerprint C56, a fingerprint of the chunk corresponding to the field group is stored. The fingerprint is the value obtained by applying the hash function to the data of the chunk and is used to check the identity (duplication) of the chunk. As a method of calculating the fingerprint, for example, the MD5 or the SHA-1 may be used. The fingerprint is set at the time of the duplication determination processing.

FIG. 17 is a configuration diagram for illustrating the example of the operation log list T60 according to the third embodiment.

The operation log list T60 stores an entry (log) for each operation. The operation log list T60 includes fields of an operation type C61, a Logical Block Addressing (LBA) C62, a Size C63, a Flag C64, and a Timestamp C65.

In the operation type C61, a block operation type corresponding to an entry is stored. As the operation type, there exist, for example, Write (update) and Read (read).

In the LBA C62, a start position of a block being a target of a block operation corresponding to the entry is stored.

In the Size C63, a size of the block operation corresponding to the entry is stored.

In the Flag C64, whether or not the duplication rate of the volume has decreased by a threshold value before data update and after the update in the duplication determination operation is stored. When the decrease in duplication rate is equal to or larger than the threshold value, True is stored. When the decrease in duplication rate is smaller than the threshold value, False is stored. In a case of the other operations, a value is not stored.

In the Timestamp C65, a timestamp of a time of the operation corresponding to the entry is stored.

<Examples of Processing Operation of Block Storage>

Details of examples of the processing operations of the block storage 20 according to the present embodiment are next described with reference to FIG. 18 to FIG. 21.

FIG. 18 is a flowchart for illustrating an example of block I/O processing according to the third embodiment.

Block I/O processing S700 is executed by the processor 210 executing the block storage control program P11 in the block storage 20. A block I/O request is read as a request for a block I/O operation directed to the block storage 20 and is described so in the flowchart.

When the block storage control program P11 receives the block I/O request from the client 21 (S701), the block storage control program P11 executes the protocol processing.

After that, the block storage control program P11 executes the requested block I/O operation (S702).

After that, the block storage control program P11 adds a content of the executed block I/O operation to the operation log list T60 (S703) and ends the block I/O processing (S799).

FIG. 19 is a flowchart for illustrating an example of block update processing according to the third embodiment.

Block update processing S800 is a type of the block I/O operation executed in Step S702. The block update processing S800 is executed by the processor 210 executing the block storage control program P11 in the block storage 20.

The block storage control program P11 checks the duplication state management table T50 and checks whether or not a chunk corresponding to an update region includes those that have been subjected to the duplication determination processing (True is stored in the post-duplication determination processing flag C54) (S801). When a chunk subjected to the duplication determination processing is included (YES in S801), the block storage control program P11 transitions to Step S802. When a chunk subjected to the duplication determination processing is not included (NO in S801), the block storage control program P11 transitions to Step S803.

When the block storage control program P11 determines that a chunk subjected to the duplication determination processing is included in Step S801, the block storage control program P11 acquires the fingerprint C56 of the chunk subjected to the duplication determination processing from the duplicated chunk determination table T20, and subtracts 1 from the number of chunks C22 in the duplicated chunk determination table T20 (S802). When the number of chunks is 0, the block storage control program P11 may delete this entry.

When the block storage control program P11 determines that a chunk subjected to the duplication determination processing is not included in Step S801 or after Step S802, the block storage control program P11 writes an update content in the target region in reference to the requested block update and reflects the update content to the target region (S803). The target region is a region to which the data is actually written and is a storage destination of the block to be updated.

After that, the block storage control program P11 changes the post-duplication determination processing flag C54 in the duplication state management table T50 of the chunk corresponding to the update region to False (S804) and ends the block update processing (S899). Note that, when a determination of NO is made in Step S801, the post-duplication determination processing flag C54 may be updated from False to False.

FIG. 20 is a flowchart for illustrating an example of the duplication detection processing according to the third embodiment.

Duplication detection processing S900 is executed by the processor 210 executing the duplication detection program P12 in the block storage 20. The duplication detection program P12 checks the duplication state management table T50 and makes the duplication determination for a block to which the data update has been applied (chunk having False in the post-duplication determination processing flag C54). The duplication detection processing S900 indicates the duplication detection processing in units of the block in a certain volume. The duplication detection program P12 is periodically executed.

First, the duplication detection program P12 reads information on a target volume from the duplication state management table T50 (S901).

Processing in Steps S902 to S909 is similar to the processing in S302 to S309 of FIG. 9, and hence a detailed description is omitted.

When the duplication detection program P12 determines that the target chunk is a terminal block of the duplication management unit in Step S909 (YES in S909), the duplication detection program P12 checks the duplication state C55 in the duplication state management table T50 of the target volume, and calculates the duplication rate in units of the volume (S910). The duplication rate may be obtained as the number of chunks having detected duplication/the number of all chunks or as the total size of regions having detected duplication/the volume size.

After that, the duplication detection program P12 compares the previous duplication rate of the volume and the duplication rate calculated in Step S910 with each other, to determine whether or not the duplication rate has decreased by an amount equal to or larger than the duplication rate threshold value (S911). When the duplication rate has decreased by an amount equal to or larger than the duplication rate threshold value (YES in S911), the duplication detection program P12 transitions to Step S912. When the duplication rate has not decreased by an amount equal to or larger than the duplication rate threshold value (NO in S911), the duplication detection program P12 transitions to Step S913.

When the duplication rate has decreased by an amount equal to or larger than the duplication rate threshold value (YES in S911), the duplication detection program P12 adds, through the duplication determination operation, an entry having True in the Flag C64 to the operation log list T60 (S912).

When the duplication rate has not decreased by an amount equal to or larger than the duplication rate threshold value (NO in S911), the duplication detection program P12 adds, through the duplication determination operation, an entry having False in the Flag C64 to the operation log list T60 (S913).

After Step S912 or S913, the duplication detection program P12 changes the duplication rate C52 in the duplication state management table T50 of the target file to the duplication rate calculated in S910 (S914) and ends the duplication detection processing (S999).

Figure 21:
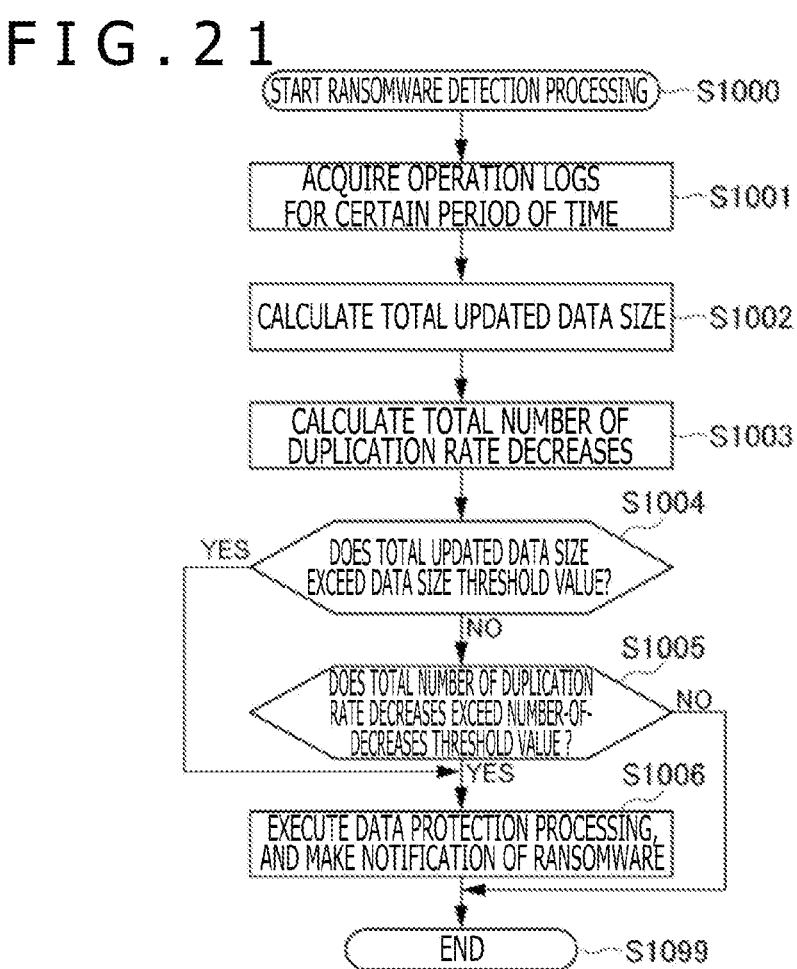
FIG. 21 is a flowchart for illustrating an example of the ransomware detection processing according to the third embodiment of the present invention.

FIG. 21 is a flowchart for illustrating an example of the ransomware detection processing according to the third embodiment. Note that the Rename operation does not exist in the update processing in units of the volume, and hence, the processing (S402) of calculating the total number of Renamed files as illustrated in FIG. 10 does not exist.

Ransomware detection processing S1000 is executed by the processor 210 executing the ransomware detection program P13 in the block storage 20.

First, the ransomware detection program P13 acquires the operation logs in a certain period of time from the operation log list T60 (S1001).

After that, the ransomware detection program P13 calculates the total updated data (overwriting existing data) size from the operation logs (S1002). It is not required to count the update of the same region performed a plurality of times for a certain block.

After that, the ransomware detection program P13 calculates the total number of volumes (total number of duplication rate decreases) each having a decreased duplication rate from the operation logs (S1003).

After that, the ransomware detection program P13 checks whether or not the total updated data size exceeds a data size threshold value (S1004). When the total updated data size exceeds the data size threshold value (YES in S1004), the ransomware detection program P13 transitions to Step S1006. When the total updated data size does not exceed the data size threshold value (NO in S1004), the ransomware detection program P13 transitions to Step S1005.

After that, the ransomware detection program P13 checks whether or not the total number of duplication rate decreases exceeds a number-of-decreases threshold value (S1005). When the total number of duplication rate decreases exceeds the number-of-decreases threshold value (YES in S1005), the ransomware detection program P13 transitions to Step S1006. When the total number of duplication rate decreases does not exceed the number-of-decreases threshold value (NO in S1005), the ransomware detection program P13 transitions to Step S1099.

Note that it is determined that the attack by the ransomware is going on when any one of the values exceeds the respective threshold value in Steps S1004 and S1005. The determination method is not limited to the case described herein and includes a case in which all of the values exceeds the respective threshold values and a case in which a weighted sum of the values exceeds a threshold value.

When the total updated data size exceeds the data size threshold value (YES in S1004) or the total number of duplication rate decreases exceeds the number-of-decreases threshold value (YES in S1005), the ransomware detection program P13 requests the data protection processing program P14 for the data protection processing and notifies the management terminal 23 which manages the block storage 20 of the possibility of the attack by the ransomware (S1006). After that, the ransomware detection processing is ended (S1099).

In the block storage system according to the third embodiment described above, the ransomware detection is executed in the block storage 20, and the duplication rate decrease is monitored in units of the volume. When the attack by the ransomware is detected, the data protection processing by the data protection processing program P14 is promptly executed, and hence, the influence of the attack on the block by the ransomware can be suppressed.

Modification Examples

The file storage system or the block storage system according to each of the embodiments described above is built in a computer system, but the file storage or the block storage may be built in a cloud server. In this case, the client or the management terminal may be in such a form that the client or the management terminal makes an access to the file storage or the block storage via a communication line such as the Internet according to necessity and stores data.

Moreover, there may be provided such a configuration that program which executes the processing according to each a embodiment is configured to be distributable and a PC or the like can independently execute this program after the reception of this program. In this case, even an offline PC or the like can detect the ransomware.

Note that the present invention is not limited to each embodiment and it should be understood that various other application examples and modification examples can be made as long as the application examples and the modification examples do not depart from the purport of the present invention described in the scope of claims.

For example, the embodiments described above are detailed and specific descriptions of the configurations of the devices and systems for the sake of an easy-to-understand description of the present invention, and the present invention is not necessarily limited to the embodiments including all the described configurations. Moreover, a part of the configuration according to the embodiment described herein can be replaced by the configuration according to another embodiment, and, further, to a configuration according to a certain embodiment, a configuration according to another embodiment can be added. Moreover, a part of a configuration according to each embodiment may be removed, another configuration may be added to this part, and this part may be replaced by another configuration.

Moreover, a control line and an information line considered necessary for the description are illustrated, and all of control lines and information lines on a product are not necessarily illustrated. It can be considered that almost all of the configurations are in practice connected to one another.

What is claimed is:

1. A storage system including a processor that processes data input to and output from a storage device, the processor deduplicating duplicated data, storing the deduplicated data in the storage device, and calculating a duplication rate being a ratio of duplicated data in a predetermined unit of storage, the storage system comprising:

a duplication detection section that operates on the processor and detects a change between a duplication rate before an update of the data and a duplication rate after the update of the data in units of the predetermined unit of storage; storage; and a malicious program detection section that operates on the processor, and detects that the data is updated by a malicious program, when a decrease amount of the duplication rate exceeds a duplication rate threshold value relating to the detected change in duplication rate;

a duplication state management table that manages a duplication state of the data in units of the unit of storage; and an operation log list that stores an operation log for each operation executed on the data, wherein the duplication detection section calculates the change in duplication rate of the data having "not duplicated" stored in the duplication state management table, wherein the malicious program detection section detects update of the data by the malicious program in reference to the operation log, wherein information indicating the detection of the decrease amount of the duplication rate exceeding the duplication rate threshold value by the duplication detection section is included as the type of the operation executed on the data in the operation log, and wherein the malicious program detection section detects the update of the data by the malicious program when the number of decrease amounts of the duplication rate each exceeding the duplication rate threshold value in the certain period of time and being stored in the operation log list exceeds a number-of-decreases threshold value relating to the number of decrease amounts of the duplication rate each exceeding the duplication rate threshold value.

2. The storage system according to claim 1, wherein a rename operation of changing a name of the data is included as a type of the operation executed on the data in the operation log, and the malicious program detection section detects the update of the data by the malicious program when the number of rename operations stored in the operation log list in a certain period of time exceeds a number-of-rename-operation threshold value relating to the number of rename operations.

3. The storage system according to claim 2, wherein a write operation of updating the data is included as the type of the operation executed on the data in the operation log, and the malicious program detection section detects the update of the data by the malicious program when a data size of data updated by the write operation stored in the operation log list in the certain period of time exceeds a data size threshold value relating to the data size of the data updated by the write operation.

4. The storage system according to claim 1, wherein the malicious program detection section detects the update of the data by the malicious program according to a combination of at least two of the number of rename operations in the certain period of time, the data size of the data updated by the write operation in the certain period of time, and the number of decrease amounts of the duplication rate each exceeding the duplication rate threshold value in the certain period of time.

5. The storage system according to claim 1, further comprising:

a duplicated chunk determination table that stores a fingerprint generated in correspondence to an offset of the data managed by the duplication state management table and the number of chunks obtained by dividing the data into chunks each having a predetermined length, wherein the duplication detection section calculates the fingerprint of the chunk for which the duplication state is not determined, in reference to the duplication state management table, increments, when the calculated fingerprint matches the fingerprint stored in the duplicated chunk determination table, the number of chunks of the chunk having a fingerprint matching the calculated fingerprint, adds, when the calculated fingerprint does not match the fingerprint stored in the duplicated chunk determination table, the calculated fingerprint to the duplicated chunk determination table, and calculates the duplication rate in reference to the number of chunks.

6. The storage system according to claim 5, wherein the unit of storage is any one of each block, each file, each file type, each directory, and each volume.

7. The storage system according to claim 6, further comprising:

a protection processing unit that operates on the processor and executes protection processing for the data updated by the malicious program and detected by the malicious program detection section.

8. A malicious program detection method used in a storage system including a processor that processes data input to and output from a storage device, the malicious program detection method comprising:

a step of deduplicating, by the processor, duplicated data, storing the deduplicated data in the storage device, and calculating a duplication rate being a ratio of duplicated data in a predetermined unit of storage;

a step of detecting, by the processor, a change between a duplication rate before an update of the data and a duplication rate after the update of the data in units of the predetermined unit of storage; and a step of detecting, by the processor, that the data is updated by a malicious program, when a decrease amount of the duplication rate exceeds a duplication rate threshold value relating to the detected change in duplication rate;

a step of managing, by the processor utilizing a duplication state management table, in a duplication state of the data in units of the unit of storage; and a step of storing, by the process utilizing an operation log list, an operation log for each operation executed on the data, wherein the processor calculates the change in duplication rate of the data having "not duplicated" stored in the duplication state management table, wherein the processor detects update of the data by the malicious program in reference to the operation log, wherein information indicating the detection of the decrease amount of the duplication rate exceeding the duplication rate threshold value by the processor is included as the type of the operation executed on the data in the operation log, and wherein the processor detects the update of the data by the malicious program when the number of decrease amounts of the duplication rate each exceeding the duplication rate threshold value in the certain period of time and being stored in the operation log list exceeds a number-of-decreases threshold value relating to the number of decrease amounts of the duplication rate each exceeding the duplication rate threshold value.

9. A storage system including a processor that processes data input to and output from a storage device, the processor deduplicating duplicated data, storing the deduplicated data in the storage device, and calculating a duplication rate being a ratio of duplicated data in a predetermined unit of storage, the storage system comprising:

a duplication detection section that operates on the processor and detects a change between a duplication rate before an update of the data and a duplication rate after the update of the data in units of the predetermined unit of storage;

a malicious program detection section that operates on the processor, and detects that the data is updated by a malicious program, when a decrease amount of a duplication rate after an update of data compared to a duplication rate before the update of the data exceeds a duplication rate threshold value relating to the detected change in duplication rate;

a duplication state management table that manages a duplication state of the data in units of the unit of storage; and an operation log list that stores an operation log for each operation executed on the data, wherein the duplication detection section calculates the change in duplication rate of the data having "not duplicated" stored in the duplication state management table, wherein the malicious program detection section detects update of the data by the malicious program in reference to the operation log, wherein information indicating the detection of the decrease amount of the duplication rate exceeding the duplication rate threshold value by the duplication detection section is included as the type of the operation executed on the data in the operation log, and wherein the malicious program detection section detects the update of the data by the malicious program when the number of decrease amounts of the duplication rate each exceeding the duplication rate threshold value in the certain period of time and being stored in the operation log list exceeds a number-of-decreases threshold value relating to the number of decrease amounts of the duplication rate each exceeding the duplication rate threshold value.

* * * * *